US007515832B2

(12) United States Patent
Kikuchi

(10) Patent No.: US 7,515,832 B2
(45) Date of Patent: Apr. 7, 2009

(54) OPTICAL TRANSMISSION EQUIPMENT AND INTEGRATED CIRCUIT

(75) Inventor: Nobuhiko Kikuchi, Tokyo (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 593 days.

(21) Appl. No.: 11/354,136

(22) Filed: Feb. 15, 2006

(65) Prior Publication Data

US 2006/0269294 A1 Nov. 30, 2006

(30) Foreign Application Priority Data

May 31, 2005 (JP) ............................... 2005-158926

(51) Int. Cl.
*H04B 10/00* (2006.01)
(52) U.S. Cl. ...................... 398/161; 398/182; 398/185; 398/188; 398/102
(58) Field of Classification Search ................. 398/161, 398/182, 185, 188, 102
See application file for complete search history.

(56) References Cited

U.S. PATENT DOCUMENTS

| 6,049,551 | A  | * | 4/2000 | Hinderks et al. ............ 370/468 |
| 6,532,320 | B1 | * | 3/2003 | Kikuchi et al. ............... 385/24 |
| 6,850,663 | B2 | * | 2/2005 | Kikuchi et al. ............... 385/24 |
| 7,257,328 | B2 | * | 8/2007 | Levinson et al. ............ 398/182 |
| 2002/0012495 | A1 | * | 1/2002 | Sasai et al. ..................... 385/24 |

OTHER PUBLICATIONS

Griffin, R.A. et al., "10 Gb/s Optical Differential Quadrature Phase Shift Key (DQPSK) Transmission Using GaAs/AlGaAs Integration", OFC, (2002), pp. FD6-1-FD6-3.
Sekine, K. et al., "Proposal and Demonstration of 10-Gsymbol/sec 16-airy (40 Gbit/s) Optical Modulation/Demodulation Scheme", Paper We3.4.5, ECOC, (2004), pp. 1-2.
MAX3831/MAX3832 Manual, "MAXIM +3.3V, 2.5Gbps, SDH/SONET, 4-Channel Interconnect Mux/Demux ICs with Clock Generator", Maxim Integrated Product, Inc., Document Ref.: 19-1534, Rev. 1, (Oct. 1999), pp. 1-16.
Yoneyama, M. et al., "Differential Precoder IC Modules for 20- and 40-Gbit/s Optical Duobinary Transmission Systems", IEEE Transactions on Microwave Theory and Techniques, vol. 47, No. 12, (Dec. 1999), pp. 2263-2270.

* cited by examiner

*Primary Examiner*—Kenneth N Vanderpuya
*Assistant Examiner*—Hibret A Woldekidan
(74) *Attorney, Agent, or Firm*—Reed Smith LLP; Juan Carlos A. Marquez, Esq.

(57) ABSTRACT

Optical transmission equipment, capable of electrically adjusting the delay difference between a plurality of digital signal paths to be connected to a multilevel optical modulation unit or demodulation unit, having multiplexing circuits connected to the digital signal paths and a delay adjustment unit inserted in one of the digital signal paths to adjust delay of N-bit-parallel low-speed digital signals with the timing unit of a bit period of a high-speed serial digital signal to be outputted from multiplexing circuit.

18 Claims, 18 Drawing Sheets

OPTICAL TRANSMITTER 100

OPTICAL TRANSMITTER 100

FIG.2A
WITHOUT CODING
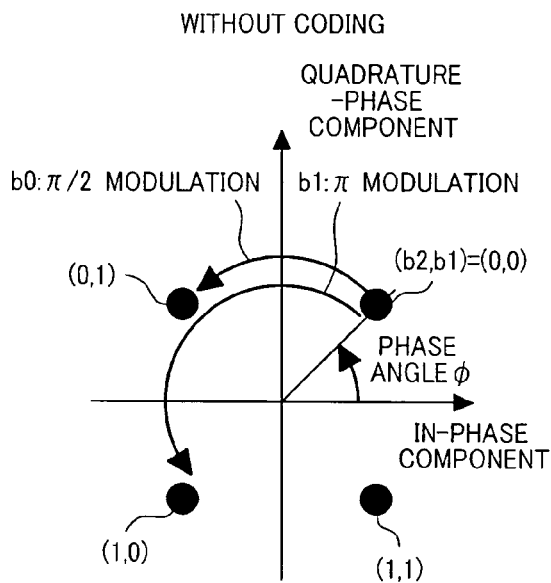
FIG.2B
WITH GREY CODING
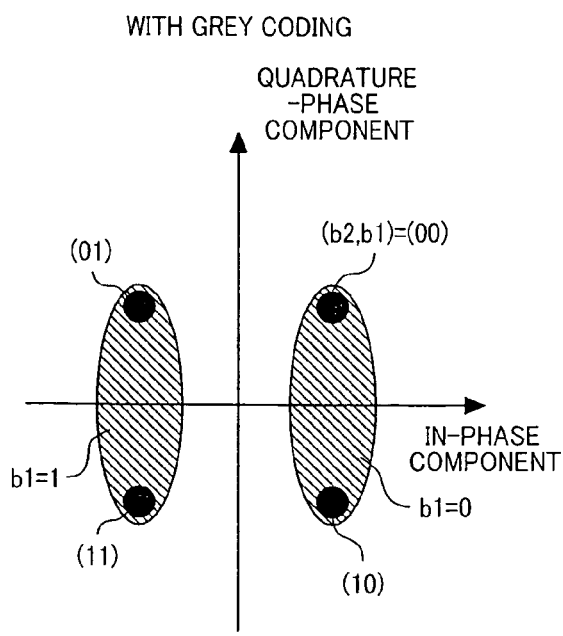
FIG.3A
GREY CODER 126
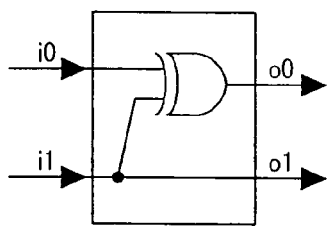
FIG.3B
TRUTH TABLE FOR GREY CODER
| INPUT | | OUTPUT | |
|---|---|---|---|
| i1 | i0 | o1 | o0 |
| 0 | 0 | 0 | 0 |
| 0 | 1 | 0 | 1 |
| 1 | 0 | 1 | 1 |
| 1 | 1 | 1 | 0 |
FIG.3C
PARALLEL PSK PRECODER 103
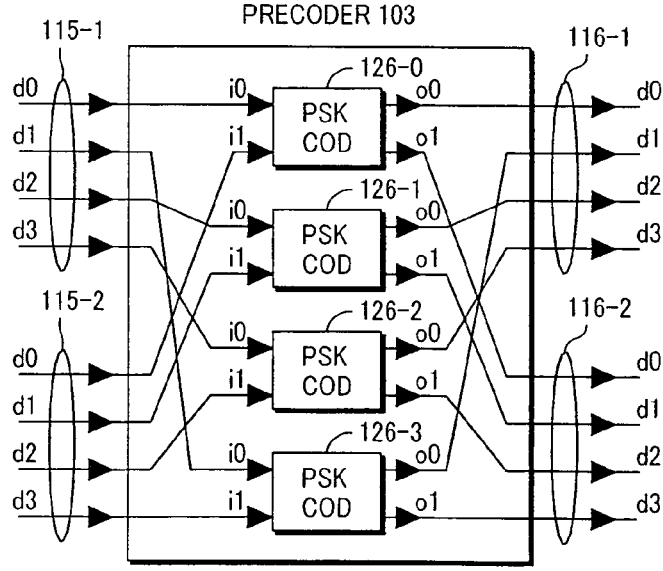

DELAY CONTROL BUFFER 105

LOW SPEED PARALLEL SIGNAL ON PATH 116-1

LOW SPEED PARALLEL SIGNAL ON PATH 116-2

OUTPUT OF DELAY CONTROL BUFFER 105-2

OUTPUT OF MULTIPLEXER 106-1

OUTPUT OF MULTIPLEXER 106-2

OPTICAL SIGNAL ARRIVING AT OPTICAL MODULATOR 109-2

ELECTRICAL SIGNAL 107-2 ARRIVING AT OPTICAL MODULATOR 109-2

OPTICAL RECEIVER 200

FIG.7
DPSKDET 206-2
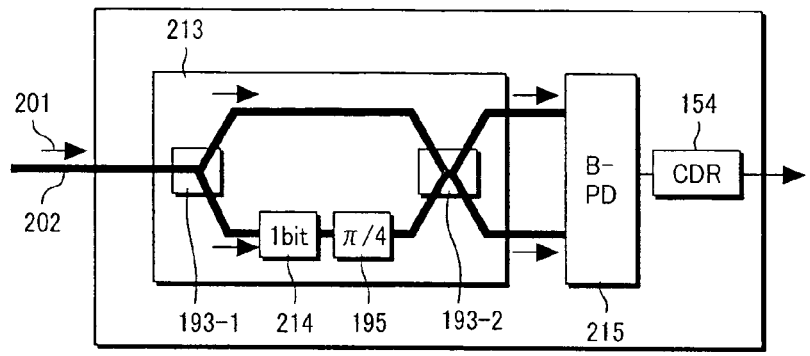
FIG.8A
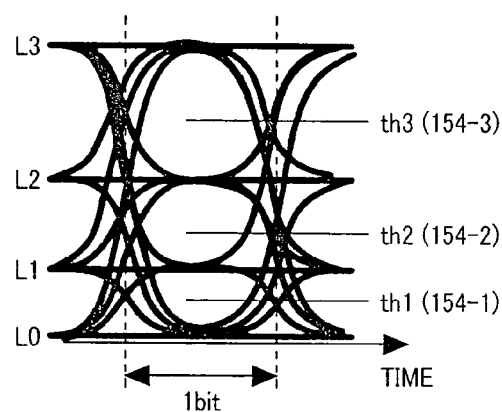
FIG.8B
| INPUT | | | OUTPUT | | |
|---|---|---|---|---|---|
| i2 | i1 | i0 | o1 | o0 | |
| 0 | 0 | 0 | 0 | 0 | |
| 0 | 0 | 1 | 0 | 1 | |
| 0 | 1 | 0 | | | ERROR |
| 0 | 1 | 1 | 1 | 0 | |
| 1 | 0 | 0 | | | ERROR |
| 1 | 0 | 1 | | | ERROR |
| 1 | 1 | 0 | | | ERROR |
| 1 | 1 | 1 | 1 | 1 | |

FIG.9A

HIGH SPEED SERIAL SIGNAL FROM DIFFERENTIAL OPTICAL PHASE DETECTOR

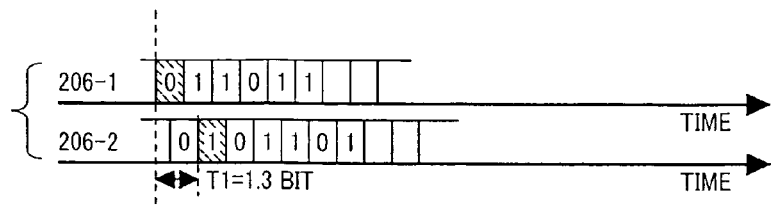

FIG.9B

HIGH SPEED SERIAL SIGNAL FROM CDR

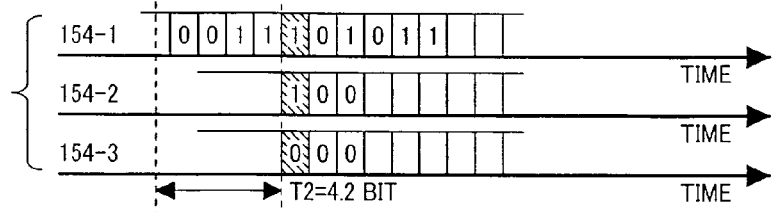

FIG.9C

LOW SPEED PARALLEL SIGNAL FROM DEMULTIPLEXER 155-4

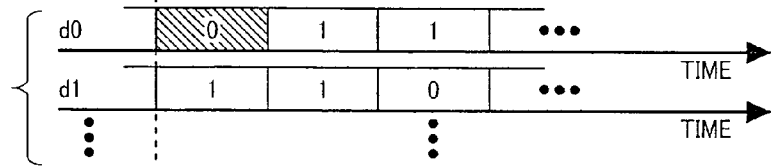

FIG.9D

LOW SPEED PARALLEL SIGNAL FROM DEMULTIPLEXER 155-5

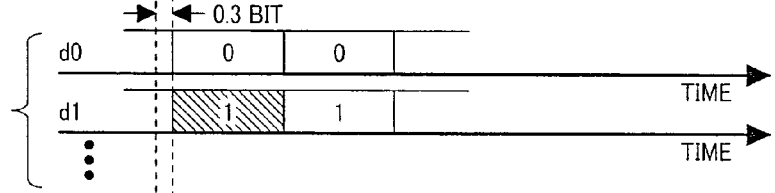

FIG.9E

LOW SPEED PARALLEL SIGNAL FROM DEMULTIPLEXER 155-1

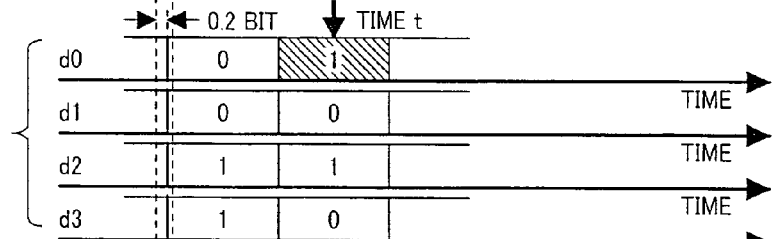

FIG.9F

OUTPUT OF DELAY CONTROL BUFFER 105-4 (4-BIT DELAYED LOW SPEED PARALLEL SIGNAL)

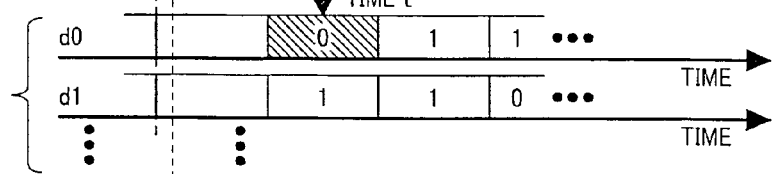

FIG.9G

OUTPUT OF DELAY CONTROL BUFFER 105-5 (3-BIT DELAYED LOW SPEED PARALLEL SIGNAL)

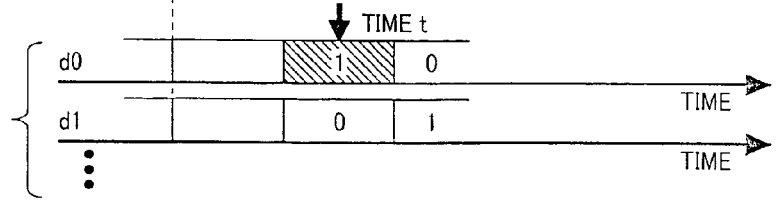

OPTICAL TRANSMITTER 100

CLOCK FOR
MULTIPLEXER 106-1

TIME

OUTPUT OF
MULTIPLEXER 106-1

TIME

CLOCK FOR
MULTIPLEXER 106-2

TIME

OUTPUT OF
MULTIPLEXER 106-2

TIME

INPUT SIGNAL OF
MODULATOR
INPUT PORT 173-1

TIME

INPUT SIGNAL OF
MODULATOR
INPUT PORT 173-2

TIME

OPTICAL TRANSMITTER 100

OPTICAL TRANSMITTER 100

OPTICAL RECEIVER 200

OPTICAL RECEIVER 200

PARALLEL ELASTIC BUFFER

OPTICAL TRANSMISSION EQUIPMENT AND INTEGRATED CIRCUIT

CLAIM OF PRIORITY

The present application claims priority from Japanese application serial No. 2005-158926, filed on May 31, 2005, the content of which is hereby incorporated by reference into this application.

BACKGROUND OF THE INVENTION (1) Field of the Invention

The present invention relates to optical transmission equipment and to an integrated circuit. More particularly, the present invention relates to optical transmission equipment comprising an optical modulation unit including a plurality of optical modulators or an optical demodulation unit for receiving a multilevel modulated optical signal from an external optical transmission line and outputting a plurality of electric high-speed serial digital signal streams converted from the received signal and to an integrated circuit applicable to the optical transmission equipment.

(2) Description of Related Art

The recent increases in the number of wavelengths in WDM transmission and in optical signal modulation speed have increased an amount of information (transmission capacity) that can be transmitted through a single optical fiber. However, there is a feeling that the transmission capacity has reached a limit at about 10 Tbit/s (Terabit/second) and has continued to hover thereareound for these several years. This is because the wavelength band usable for optical transmission has reached a limit under constraints on the bandwidth (totaled to about 80 nm=10 THz when the C-band, L-band, and S-band are viewed in combination) of the optical fiber amplifier so that there is no room for an increase in the number of wavelengths in WDM transmission. In such a situation, to increase the optical transmission capacity, it has become essential to improve the use efficiency of the frequency band by devising an improved signal modulation format and fill up the limited frequency band with a larger number of optical signals.

From the 1960s onward, the application of a multilevel modulation technology to wireless communication has enabled high-efficiency signal transmission featuring a spectral efficiency over 10. Multilevel modulation, which is effective in wireless communication, can also be considered as a promising technology even in signal transmission using an optical fiber as a medium so that numerous studies have been made conventionally thereon.

For example, a QPSK (Quadrature Phase Shift Keying) that performs four-level phase modulation is reported in Document 1: R. A. Griffin, et, al., "10 Gb/s Optical Differential Quadrature Phase Shift Key (DQPSK) Transmission using GaAs/AlGaAs Integration," OFC 2002, Paper PD-FD6, 2003. Further, 16-level amplitude and phase modulation, which is a combination of four-level amplitude modulation and four-level phase modulation, is reported in Document 2: Kenro Sekine, Nobuhiko Kikuchi, Shinya Sasaki, Shigenori Hayase and Chie Hasegawa, "Proposal and Demonstration of 10-Gsymbol/sec16-ary (40 Gbit/s) Optical Modulation/Demodulation Scheme," Paper We3.4.5, ECOC 2004.

As examples of a modulation format which allows longer-distance optical transmission than prior art by ideally modulating the phase and amplitude of an optical signal simultaneously, there have been proposed optical duo-binary modulation, DPSK (Differential PSK) modulation, and the like.

FIG. 23 shows an example of the basic structure of a conventional optical transmitter 140 for binary intensity modulation.

The optical transmitter for binary intensity modulation comprises a 16-bit-parallel signal input terminal 101 for receiving in parallel sixteen streams of a 3-Gbit/s electric low-speed digital signals in the XAUI format. The electric low-speed parallel digital signals supplied from the parallel input terminal 101 are inputted to a parallel elastic buffer (EB) circuit 102 and outputted to a multiplexing circuit 141 with their respective timings being matched. The multiplexing circuit 141 time-multiplexes 3-Gbit/s×16, i.e., the total of 48-Gbit/s digital data and converts the frame format from XAUI to SONET. The resultant SONET signal is outputted as a 40-Gbit/s high-speed serial digital signal stream from the multiplexing circuit 141 to a transmission line 107.

The high-speed serial digital signal stream is appropriately amplified and supplied to an optical intensity modulator, e.g., a Lithium-Niobate type optical intensity modulator 110 coupled to an optical fiber transmission line. To the optical intensity modulator 110, output light from a semiconductor laser diode (LD) 108 serving as a signal source for an optical fiber is inputted via an optical fiber line 111-1. The output light from the semiconductor laser 108 is subjected to binary ON/OFF intensity modulation by the optical intensity modulator 110 and outputted as output light 113 to an output optical fiber 112 via an optical fiber line 111-2.

FIG. 24 shows a structure of the parallel elastic buffer circuit 102 shown in FIG. 23.

The 3-Gbit/s digital signals d0 to d15 supplied from sixteen signal lines 101 connected to the parallel input terminal 101 are inputted to FIFO (FIRST IN FIRST OUT) circuits 142-1 to 142-16 each having a 10-bit memory capacity. From the FIFO circuits, electric digital signals (d0 to d15) are outputted in parallel to output signal lines with their respective timings being adjusted.

FIG. 25 shows an example of the basic structure of a conventional optical receiver 150 for binary intensity modulation.

A 40-Gbit/s input optical signal 151 in the SONET format supplied from an input optical fiber 152 is inputted to a photo diode 153 via an optical fiber line 111. The input optical signal is converted into an electric digital signal by the photo diode 153 and inputted to a clock extraction and data recovery circuit (CDR) 154 where the digital signal is converted to a high-speed serial digital signal stream. An output signal stream from the CDR 154 is inputted to a demultiplexer (DEMUX) 155 via the transmission line 107 to convert the signal into 3-Gbit/s×16 signals in the XAUI format and outputted as low-speed parallel digital signals to an output transmission path 156.

An integrated circuit (IC) mounting circuitry elements equivalent to 101, 102, and 141 shown in FIG. 23 is proposed, for example, in Document 3: MAX3831/MAX3832+3.3 V, 2.5 Gbps, SDH/SONET, 4-Channel Interconnect Multiplexer/Demultiplexer ICs with Clock Generator available from Maxim Integrated Product, Inc., Document Ref.: 19-1534; Rev 1: October 1999.

In the IC proposed by Document 3, a final output is a 2.4-Gbit/s digital signal and 622-Mbit/s digital signals are inputted to four signal lines equivalent to the parallel input terminal 101. These input signals are converted into a 2.4-Gbit/s high-speed serial digital signal by a 4:1 multiplexing circuit MUX after adjusting their timings by an elastic store circuit corresponding to the elastic buffer circuit 102 and outputted to an output terminal.

The elastic store circuit disclosed in Document 3 has a 10-bit-length memory capacity and has been adjusted to output four low-speed signal data streams with equal timings immediately after the rising edge of are set signal. The elastic store circuit also has the function of absorbing the skew of the low-speed signals such that the timings are automatically maintained provided that a shift in data timing observed thereafter falls within a range of ±7.5 nS (±4.7 bits).

On the other hand, a precoder comprised of a low-speed circuit as an example of the prototype of an IC for optical modulation in an optical duo-binary format is reported, for example, in Document 4: Mikio Yoneyama, Kazushige Yonenaga, Yoshiaki Kisaka, and Yutaka Miyamoto, "Differential Precoder IC Modules for 20- and 40-Gbit/s Optical Duobinary Transmission Systems," IEEE TRANSACTIONS ON MICROWAVE THEORY AND TECHNIQUES, Vol. 47, NO. 12, December 1999.

To increase the optical transmission capacity in a state with a limited number of wavelengths usable in an optical fiber for WDM transmission, it is necessary to prepare plural pairs of electric transmission signal circuits each comprised of, e.g., the parallel elastic buffer (EB) circuit 102 and the multiplexing circuit 141 shown in FIG. 23, supply high-speed serial digital signals outputted from the plurality of transmission signal circuits in parallel to a plurality of optical modulators coupled to an optical transmission line (optical fiber), thereby implement a multilevel optical modulation transmitter for simultaneously modulating the amplitudes and phases of optical signals with a plurality of information signals, and fill the limited frequency band on the optical transmission line with a larger number of optical signals.

For example, the case is assumed where transmission digital signals are subjected to parallel-serial conversion such that the first to N-th bits are inputted in parallel to the first EB circuit and the subsequent (N+1)-th to 2N-th bits are inputted in parallel to the second EB circuit. By matching timings for outputting the individual bits in the first and second EB circuits, it becomes possible to synchronize a first digital signal (the first to N-th bits) supplied from the first multiplexing circuit connected to the first EB circuit to the first optical modulator with a second digital signal (the (N+1)-th to 2N-th bits) supplied from the second multiplexing circuit connected to the second EB circuit to the second optical modulator. What is important here is whether or not a receiver side can correctly regenerate the (N+1)-th to 2N-th bits in continued relation to the first to N-th bits from the optical signals subjected to the multilevel modulation in the first and second optical modulators.

In the case where the first and second optical modulators are connected in a tandem configuration to an internal optical transmission line, e.g., the second digital signal which reaches the output optical fiber immediately after the modulation by the second optical modulator and the first digital signal which reaches the output optical fiber through the second optical modulator after the modulation by the first optical modulator have different path lengths from the multiplexing circuits to the output optical fiber. Accordingly, even though the first and second digital signals are outputted in in-phase relation from the first and second multiplexing circuits, a phase difference between the first and second digital signals occurs in multilevel modulated light observed in the output optical fiber. Therefore, in such optical transmission equipment using the multilevel modulation that multiplexes on the same output optical fiber a plurality of transmission digital signals having passed through different optical modulators, it is necessary to match signal propagation times in the individual digital signal paths including the internal optical transmission line.

Specifically, the multilevel optical modulation transmitter is required to have the function of individually adjusting signal delay time in each of the signal paths such that a transmission digital signal which passes through a shorter signal path is supplied to the optical modulator in delay slightly after another transmission digital signal which passes through a longer signal path is supplied the optical modulator and that the plurality of digital signals having been subjected to the optical modulation reach in in-phase relation to the output optical fiber. Likewise, a multilevel optical modulation receiver, in which a multilevel modulated optical signal received from an external optical transmission line is converted into a plurality of electric high-speed serial digital signal streams and these serial digital signal streams are outputted in parallel to a plurality of signal path each extending toward a decoder, also requires to have the function of individually adjusting signal delay in each of the signal paths.

However, none of Documents 1 to 4 described above has shown a practical solution to the problem associated with delay adjustment in individual signal paths that is encountered when transmission data (digital signal stream) is subjected to multilevel optical modulation using a plurality of optical modulators. In the field of wireless communication to which the multilevel modulation is also applicable, there is no useful solution to the problem associated with delay adjustment in individual signal paths that is encountered in the optical transmission equipment described above.

SUMMARY OF THE INVENTION

An object of the present invention is to provide optical transmission equipment that has effectively solved the problem of the delay difference among signal paths encountered when a sequence of transmission data are subjected to multilevel optical modulation using a plurality of optical modulators.

Another object of the present invention is to provide optical transmission equipment capable of adjusting the delay difference among a plurality of signal paths for supplying high-speed serial digital signal streams to a multilevel optical modulation unit, with the timing unit of a bit period of the high-speed serial digital signal stream or with a timing unit corresponding to an integral fraction of the bit period.

Still another object of the present invention is to provide optical transmission equipment, which comprises an optical demodulation unit for converting a multilevel modulated optical signal received from an external optical transmission line into a plurality of electric high-speed serial digital signal streams and outputting the digital signal streams in parallel to a plurality of signal paths and at least one decoder connected to each of the plurality of signal paths, capable of adjusting the delay difference among the signal paths, with the unit of a bit period of the high-speed serial digital signal stream.

Yet another object of the present invention is to provide an integrated circuit for optical transmission equipment controllable signal delay in a plurality of digital signal paths each connected to an encoder or decoder in accordance with preliminarily specified delay control amounts.

In order to attain the foregoing objects, an aspect of optical transmission equipment according to the present invention resides in that each of signal paths which require signal delay is provided with a delay control buffer circuit for adjusting the delay of a low-speed digital signal stream received in an N-bit parallel (N is an integer more than 1) with the timing unit of a bit period of a high-speed serial digital signal stream or with a timing unit corresponding to an integral fraction of the bit period.

For example, the present invention provides optical transmission equipment comprising an optical modulation unit including a plurality of optical modulators coupled to an internal optical transmission path, and an electric circuit unit for generating a plurality of high-speed serial digital signal streams to be supplied to the optical modulation unit, wherein the electric circuit unit includes a plurality of parallel signal paths each for transferring an N-bit-parallel low-speed digital signal streams (N is an integer more than 1), a plurality of multiplexing circuits each for converting the N-bit-parallel low-speed digital signal stream received from one of the parallel signal paths into a high-speed serial digital signal stream to be supplied to the optical modulation unit, and a delay control buffer circuit inserted in at least one of the parallel signal paths to receive the N-bit-parallel low-speed digital signal stream, wherein the delay control buffer circuit performs delay adjustment on the N-bit-parallel low-speed digital signal stream, with the timing unit of a bit period of the high-speed serial digital signal stream or with a timing unit corresponding to an integral fraction of the bit period and outputs the resultant digital signal stream to the parallel signal path. In this case, a sequence of transmission data encoded by various encoders suitable for multilevel optical modulation is supplied as the N-bit-parallel low-speed digital signal stream to each of the parallel signal paths.

The present invention provides, for example, optical transmission equipment comprising an optical demodulation unit for converting a multilevel modulated optical signal received from an external optical transmission path into a plurality of electric high-speed serial digital signal streams and outputting the plurality of high-speed serial digital signal streams, and an electric circuit unit for converting the plurality of high-speed serial digital signal streams received from the optical demodulation unit into a plurality of low-speed digital signal streams and outputting the plurality of low-speed digital signal streams, wherein the electric circuit unit comprises a plurality of parallel signal paths each for transferring an N-bit-parallel digital signals stream (N is an integer more than 1), a plurality of demultiplexers each for converting one of the high-speed serial digital signal stream into an N-bit-parallel low-speed digital signal stream and outputting the N-bit-parallel low-speed digital signal stream to one of the parallel signal paths, a delay control buffer circuit for performing delay adjustment on the N-bit-parallel low-speed digital signal stream, in at least one of the parallel signal paths, with the timing unit of a bit period of the high-speed serial digital signal stream or with a timing unit corresponding to an integral fraction of the bit period and outputting the resultant N-bit-parallel low-speed digital signal stream, and at least one decoder for converting the plurality of N-bit-parallel low-speed digital signal streams received from the parallel signal path into low-speed parallel digital signals in a different code.

More specifically, according to an embodiment of the invention, the delay control buffer circuit temporarily stores the N-bit-parallel low-speed digital signal stream as logically serially arranged data and outputs stored data beginning at a bit position selected in accordance with a preliminarily specified amount of delay adjustment as a delay adjusted N-bit-parallel low-speed digital signal stream to the parallel signal path, thereby implementing delay control with the timing unit of the bit period of the high-speed serial digital signal stream or with a timing unit corresponding to an integral fraction of the bit period.

In an embodiment of the present invention, the delay control buffer circuit comprises a memory for temporarily storing the N-bit-parallel received digital data as said logically serially arranged data, a write address generator for generating a write address for the N-bit parallel data, a register for storing the preliminarily specified amount of delay adjustment, and a read address generator for generating a read address for N-bit data to be outputted to the signal path based on the write address outputted from the write address generator and on the amount of delay adjustment stored in the register.

One aspect of the optical transmission equipment according to the present invention resides in that at least one of the parallel signal paths is provided with the delay adjustment unit which controls the delay of the N-bit-parallel low-speed digital signal stream with the timing unit of the bit period of the high-speed serial digital signal or with a timing unit corresponding to an integral fraction of the bit period and accurately adjusts the delay within the bit period by controlling the output timing of each bit in the high-speed serial digital signal stream to be outputted from the multiplexing circuit to the signal path. In this case, the delay control can be implemented with the timing unit of the bit period by the delay control buffer circuit described above.

The control of the delay within the bit period can be implemented by, e.g., providing a clock generator for generating clock signals to be supplied to the multiplexing circuits and an accurate delay adjustment unit for adjusting the phase of a clock signal to be supplied to a specified one of the multiplexing circuits in accordance with a preliminarily specified amount of control and causing each of the multiplexing circuits to output each bit of the high-speed serial digital signal stream with a specified timing determined in accordance with the supplied clock signal. Since the delay control accuracy of the delay control buffer circuit can be improved to an integral fraction of the bit period by increasing the operating speed thereof, the adjustment of the delay within the bit period of the high-speed serial digital signal stream can be performed even in the absence of the accurate delay adjustment unit.

Another aspect of the optical transmission equipment according to the present invention resides in that the delay control buffer circuit is provided in each of at least two parallel signal paths and the electric circuit unit includes a memory for storing the amount of delay adjustment in association with each of the parallel signal paths and a control unit for setting the amount of delay adjustment stored in the memory to the delay control buffer circuits. In the case where the optical transmission equipment is provided with both the delay control buffer circuits and the accurate delay adjustment unit, it is appropriate to store the amount of delay adjustment and the amount of clock phase control in association with each of the parallel signal path in the memory and set the amount of delay adjustment and the amount of clock phase control stored in the memory to the delay control buffer circuits and the accurate delay adjustment unit.

According to the present invention, the use of the delay control buffer circuits allows electric adjustment of a signal delay in each of the signal paths between an encoder for optical transmitter and an output optical fiber, with accuracy of the unit of bit length of the high-speed serial digital signal. As a result, even when a sequence of transmission data is divided into a plurality of digital signal streams and subjected to multilevel optical modulation via different signal paths, it becomes possible to make even the respective phases of the digital signal streams at the termination points of the signal paths. By increasing the operating speed of each of the delay control buffer circuits or by providing the accurate delay adjustment unit, precise adjustment of delay within the range of 1-bit-length of the high-speed serial digital signal stream can be realized.

According to the present invention, since the use of the delay control buffer circuits allows electric adjustment of a signal delay in the signal path between an input optical fiber and a decoder for optical receiver, a sequence of transmission data can easily be reproduced from a plurality of digital signal streams subjected to multilevel optical modulation.

BRIEF DESCRIPTION OF THE DRAWINGS

FIGS. 2A and 2B are views each for illustrating multilevel modulation encoding applied to the optical transmitter of FIG. 1.

FIGS. 3A to 3C are views each for illustrating the structure and function of a four-level phase modulation parallel precoder 103 shown in FIG. 1.

FIG. 7 is a structural view of a differential phase detector 206 in the optical receiver of FIG. 6.

FIGS. 8A and 8B are views each for illustrating the operation of discriminating a four-level intensity modulated signal and the operation of an ASK decoder 211 in the optical receiver of FIG. 6.

FIGS. 9A to 9G show timing charts of transferred signals for illustrating the function of a delay control buffer circuit applied to the optical receiver of FIG. 6.

DETAILED DESCRIPTION OF THE PREFERRED EMBODIMENTS

Figure 1:
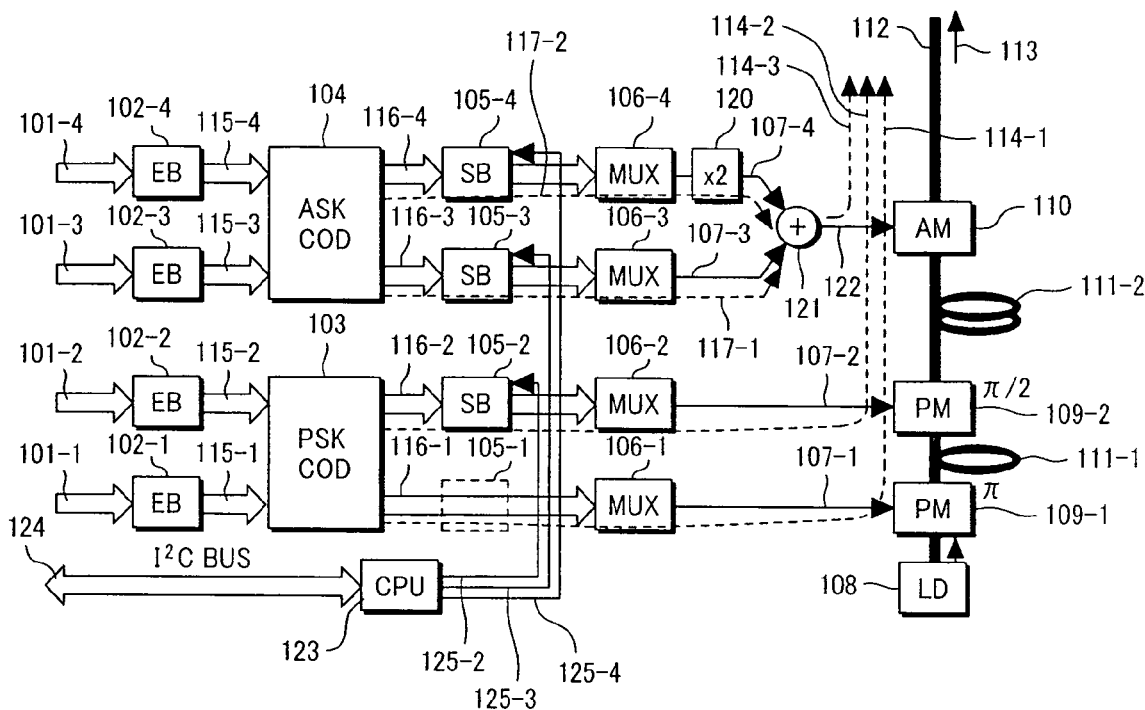
FIG. 1 is a structural view showing an embodiment of an optical transmitter to which the present invention has been applied.

Referring now to the drawings, the embodiments of the present invention will be described below.

Embodiment 1

FIG. 1 shows a structure of an optical transmitter applied to optical transmission equipment according to a first embodiment of the present invention.

The optical transmitter 100 shown here comprises two encoders 103 and 104 using different encoding formats. The encoder 103 is a parallel precoder for four-level phase modulation (PSK precoder) and the encoder 104 is a parallel precoder for four-level intensity modulation (ASK precoder).

An optical modulation unit is comprised of two optical phase modulators 109-1 and 109-2, and one optical intensity modulator 110. An CW (continuous wave) optical signal generated from a semiconductor laser 108 is subjected to four-level phase modulation by the two optical phase modulators 109-1 and 109-2 associated with the PSK precoder 103 and four-level intensity modulation by the optical intensity modulator 110 associated with the ASK precoder 104 and sent out as a 16-level optical phase/intensity modulated signal 113 to an output optical fiber 112.

The feature of the present embodiment resides in that delay control buffer circuits 105-2 to 105-4 each for delay adjustment are disposed in intervening relation in a plurality of signal paths (the broken lines 114-1 to 114-3) extending from the PSK precoder 103 and the ASK precoder 104 to the output optical fiber 112 so that a plurality of transmission signal streams following different paths are synchronized with each other when they pass through the final optical modulator, which is the optical intensity modulator 110 in the depicted example. As will be described later with reference to FIG. 4 and FIGS. 5A to 5G, output signals from the individual paths are subjected to timing adjustment performed by the delay control buffer circuits 105-2 to 105-4 with accuracy of the order of the symbol period of a high-speed optical signal, which is not more than 100 picoseconds with, e.g., a 10-Gsymbol/s optical signal.

Figure 23:
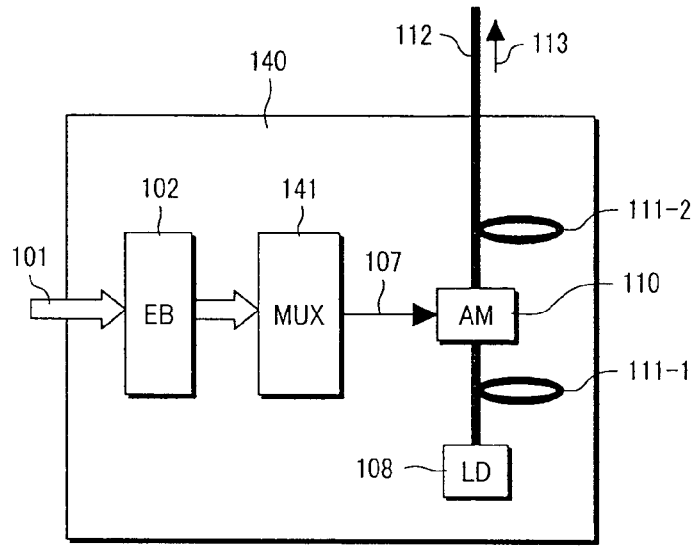
FIG. 23 is a structural view showing an example of a conventional optical transmitter.
Figure 24:
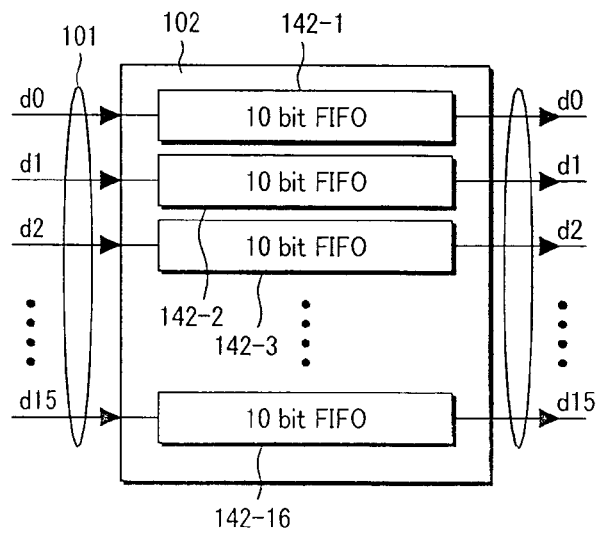
FIG. 24 is a structural view of a parallel elastic buffer 102 shown in FIG. 23.
Figure 25:
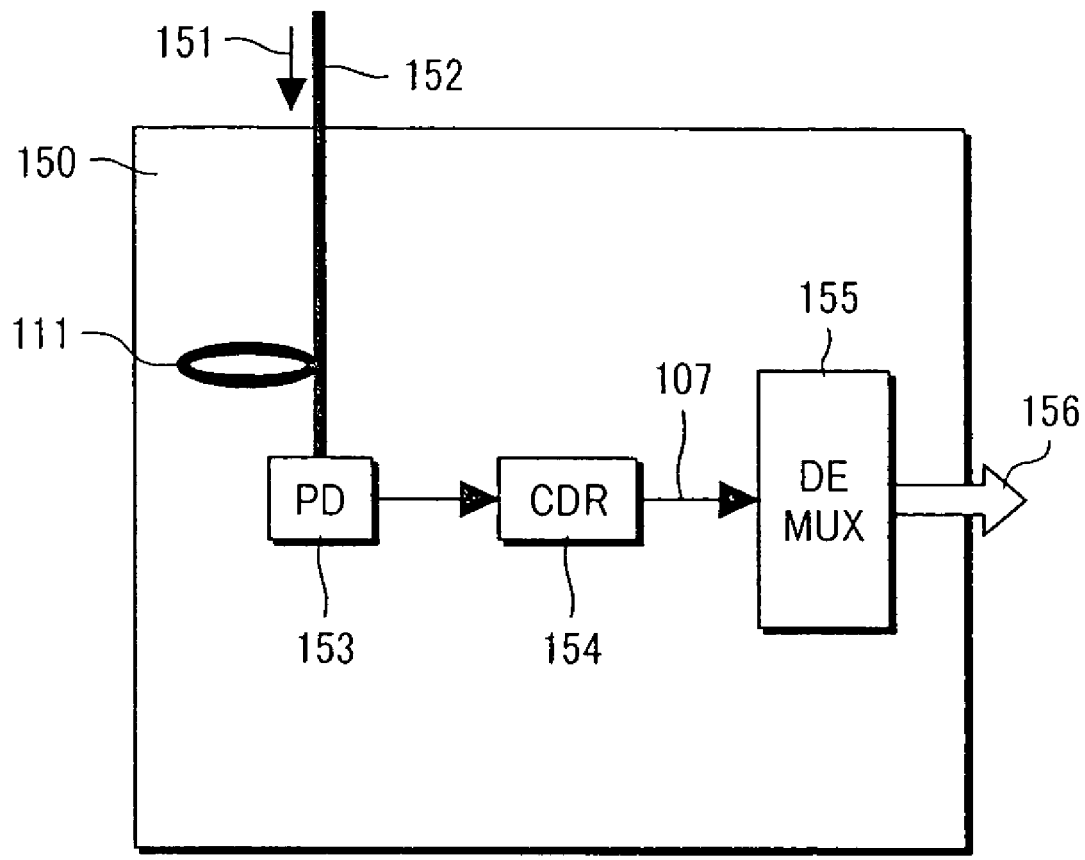
FIG. 25 is a structural view showing an example of a conventional optical receiver.

The optical transmitter 100 has four parallel buffer (elastic buffer) circuits 102-1 to 102-4 in stages previous to the encoders 103 and 104. To these buffer circuits, four streams of low-speed parallel digital data signals are inputted in parallel via respective parallel input terminals 101-1 to 101-4. The parallel buffer circuits 102-1 to 102-4 match their respective timings of outputting the digital data signals having been inputted thereto in parallel, similarly to the parallel elastic buffer circuit 102 provided in the conventional optical transmitter described with reference to FIGS. 23 and 24.

The digital signal streams outputted from the parallel buffer circuits 102-1 and 102-2 to parallel signal paths 115-1 and 115-2 are inputted to the parallel precoder 103 for four-level phase modulation. The digital signals outputted from the parallel buffer circuits 102-3 and 102-4 to parallel signal paths 115-3 and 115-4 are inputted to the parallel precoder 104 for four-level intensity modulation.

A description will be given next to encoding for four-level phase modulation by referring to FIGS. 2A and 2B.

In the embodiment shown in FIG. 1, binary phase modulation with an amplitude of $\pi/2$ performed by the optical phase modulator 109-2 is superimposed on binary phase modulation with an amplitude of $\pi$ performed by the optical phase modulator 109-1 so that, as the result of an add operation between the two phase modulations, four-level optical phase modulation at phaser angles of 0, $\pi/2$, $\pi$, and $3\pi/2$ is performed on an optical transmission line.

If it is assumed that data subjected to the phase modulation with an amplitude of $\pi/2$ is b1, data subjected to the phase modulation with an amplitude of $\pi$ is b2, and the initial phaser angle of an optical signal is $\pi/4$, four phase states are plotted as four different points at phaser angles $\phi=\pi/4$, $3\pi/4$, $5\pi/4$, and $7\pi/4$ in a phaser space as shown in, e.g., FIG. 2A. These points correspond to respective digital data sets of (b2, b1)= (0, 0), (0, 1), (1, 0), and (1, 1).

In general, when a four-level phase modulated signal is received, differential detection receiving method which detects a received optical signal by interfering it with a 1-bit delayed optical signal or diversity receiving method which detects a received optical signal by separating it into an in-phase component and a quadrature-phase component is used. In this case, a transmitting side preliminarily performs the encoding of transmission data to prevent occurrence of the change in a data pattern or error propagation in a receiver.

A description will be given by using the simplest diversity receiving as an example. In the phaser map of FIG. 2A, the value of the data b2 can be decoded with no problem from the judgment of the quadrature-phase component to be positive or negative. However, since the value of the data b1 is not determined from only the in-phase component, it is necessary to perform the judgment by considering two different cases where the data b2 is "1" and where the data b2 is "0". However, if an error occurs in the value of the data b2 due to noise, the value of the data b1 is also erroneously judged. This phenomenon is termed "error propagation."

To prevent the error propagation, the transmitting side preliminarily performs a logical operation termed a Grey code on the transmission data so that the result of phase modulation is converted into a state map as shown in FIG. 2B. According to the state map of FIG. 2B, as the value of the data b2 can be determined based on whether the quadrature-phase component is positive or negative and the value of the data b1 can also be determined based on whether the in-phase component is positive or negative without depending on the value of the data b2, the error propagation can be prevented.

FIG. 3A shows a structural view of a Grey coder applied to a binary serial digital signal, and FIG. 3B shows a truth table representing the function of the Grey coder.

2-bit serial data "i0" and "i1" inputted to the Grey coder corresponds to the data b1 and the data b2 described with reference to FIG. 2A. As is apparent from the truth table of FIG. 3B, the Grey coder outputs the value of the higher input bit "i1" as a higher output bit "o1(b2)" without any modification. On the other hand, a lower output bit "o0 (b1)" varies depending on the value of the higher input bit "i1". When "i1"=0 is satisfied, the value of the lower input bit "i0" becomes the lower output bit "o0" without any modification. When "i1"=1 is satisfied, the inverted value of the lower input bit "i0" is outputted as "o0".

FIG. 3C shows the structure of the parallel precoder (PSK precoder) 103 for four-level phase modulation applied to the optical transmitter of FIG. 1. In the PSK precoder 103 shown here, four Grey coders (126-0 to 126-3) each having the structure shown in FIG. 3A are used. To the four Grey coders, two streams of transmission data are inputted in a 4-bit (d0 to d3) parallel from parallel signal lines 115-1 and 115-2.

The j-th bit dj (j=0 to 3) of the transmission data is associated with the j-th Grey coder 126-j. Each of the Grey coders performs an encoding operation with respect to the input bits i0 and i1 received from a pair of corresponding signal lines of the parallel signal lines 115-1 and 115-2. The output bits o0 and o1 of each of the Grey coders are developed at the bit positions of the original 4-bit parallel data and outputted as encoded low-speed parallel digital signals to output signal lines 116-1 and 116-2. By increasing the number of the Grey coders 126, the number of the bits inputted to each of the parallel signal lines 115-1 and 115-2 can be increased to more than 4 bits.

In the optical transmitter of FIG. 1, higher-speed serial digital signals having Grey-coded bit arrangement are outputted to signal lines 107-1 and 107-2 by converting the parallel data outputted to the output signal paths 116-1 and 116-2 to serial data by using multiplexing circuits (MUX) 106-1 and 106-2.

The parallel precoder (ASK precoder) 104 for four-level intensity modulation is also an encoding circuit for allowing easier receiving of a four-level intensity modulated signal at the receiver side and preventing the error propagation during the signal receiving, similarly to the PSK precoder 103 described above. The ASK precoder 104 encodes low-speed data converted into 4-bit parallel data through the parallel signal lines 115-3 and 115-4. The parallel data streams outputted from the ASK precoder 104 to output signal paths 116-3 and 116-4 are converted into high-speed serial digital signal streams by multiplexing circuits (MUX) 106-3 and 106-4.

In the present embodiment, the digital signal stream outputted from the multiplexing circuit 106-1 to the signal line 107-1 is supplied to the optical phase modulator 109-1 to perform phase modulation with an amplitude of $\pi$ on the laser light outputted from the semiconductor laser 108. The digital signal stream outputted from the multiplexing circuit 106-2 to the signal line 107-2 is supplied to the optical phase modulator 109-2 to further perform phase modulation with an amplitude of $\pi/2$ on the optical signal that has been phase modulated with an amplitude of $\pi$ and passed through the optical fiber line 111-1 thereby to generate a four-level optical phase modulated signal.

The digital signal stream outputted from the multiplexing circuit 106-3 is inputted to an add circuit 121 via the signal line 107-3. On the other hand, the digital signal stream outputted from the multiplexing circuit 106-4 is amplified by a 6-dB electrical amplifier 120 so as to have a doubled amplitude and inputted to the add circuit 121 via the signal line 107-4. By performing an add operation between the two digital signal streams by the add circuit 121, a four-level amplitude modulated signal is generated. This signal is supplied to the optical intensity modulator 110 via a signal line 122. The optical intensity modulator 110 further performs 4-level optical intensity modulation on the above 4-level optical phase modulated signal that has passed through the optical fiber line 111-2. As a result, an output light 113 subjected to the total of 16-level modulation as a result of the 4-level phase modulation and the 4-level intensity modulation is outputted to the output optical fiber 112.

In the optical transmitter 100 of FIG. 1, four parallel input data streams supplied to the parallel input terminals 101-1 to 101-4 reach the output optical fiber 112 through different signal paths as indicated by the broken lines 114-1 to 114-3. The object of the present invention is to allow the data streams inputted from the parallel input terminals 101-1 to 101-4 to appear on the output optical fiber 112 without disturbing the input sequence thereof.

To attain the object, the present embodiment is characterized in that the delay control buffer circuits 105-2 to 105-4 are provided between the PSK precoder 103 and the MUX 106-2, between the ASK precoder 104 and the MUX 106-3, and between the ASK precoder 104 and the MUX 106-4, respectively, to enable digital adjustment of delay in each of the signal paths.

As indicated by the broken-line block 105-1, a delay control buffer may also be provided between the PSK precoder 103 and the MUX 106-1. In the example shown here, however, the provision of the delay control buffer circuit 105-1 is omitted and, using the signal path 114-1 with largest signal delay as the reference, signal delay in each of the other signal paths is adjusted so as to match the signal delay in the reference path 114-1. In the case where the delay control buffer circuit 105-1 is inserted in the signal path 114-1, a zero value or a minimum value may be set appropriately as its delay control amount.

Figure 4:
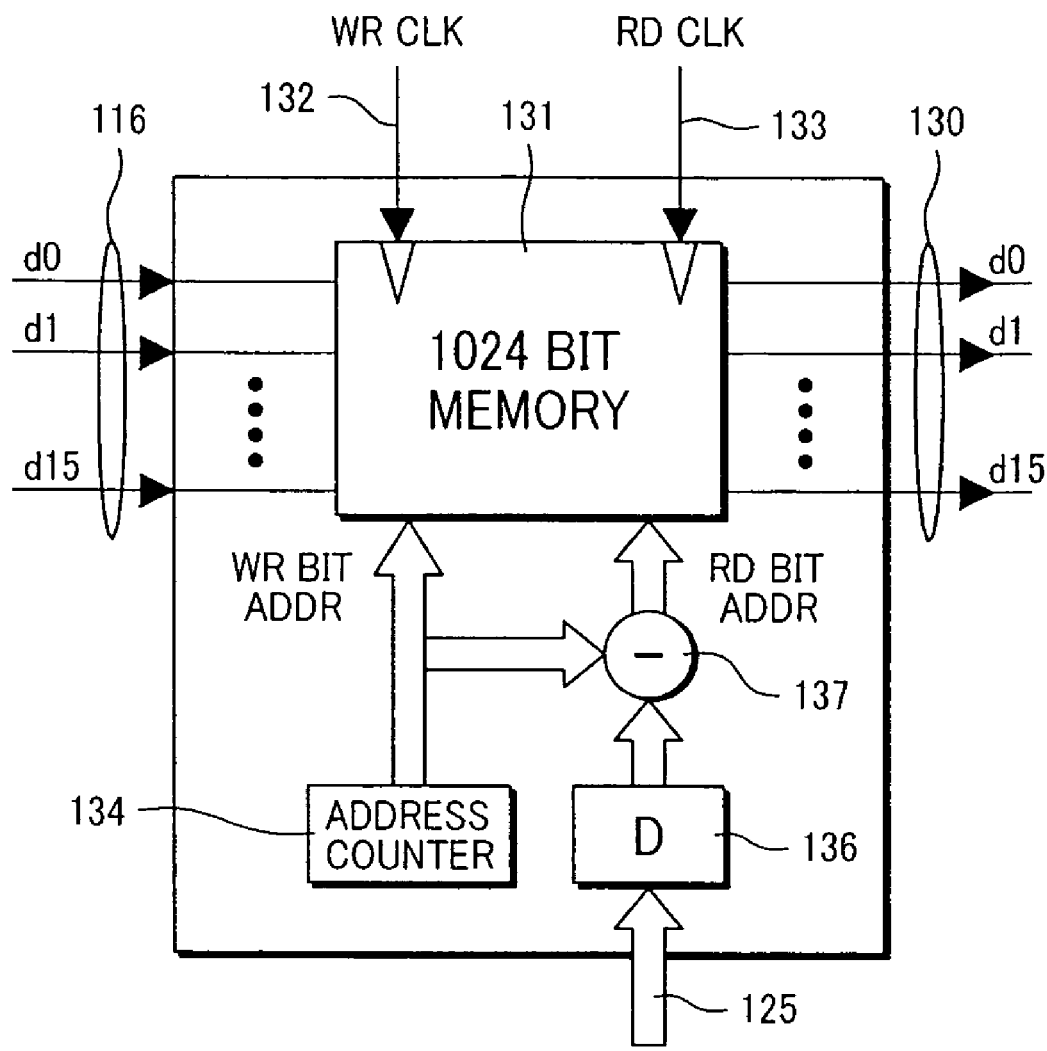
FIG. 4 is a structural view showing an embodiment of a delay control buffer circuit 105.

FIG. 4 shows an embodiment of each the delay control buffer circuits 105.

The delay control buffer circuit 105 is comprised of a 1024-bit memory 131 capable of reading/writing data asynchronously in accordance with a write clock (WRCLK) inputted to a write clock input terminal 132 and a read clock (RD CLK) inputted to a read clock input terminal 133, an address counter 134, a delay value setting register (D) 136, and a subtractor 137. In the memory 131, a low-speed parallel bit signal stream inputted from the signal path 116 is treated as a high-speed serial bit signal having a parallel signal format. Stored data in the memory 131 is outputted in parallel to output signal path 130, while controlling the delay on a bit-by-bit basis, as will be described later.

In the example shown here, the bit width of the signal path 116 is 16 bits (d0 to d15). The low-speed parallel transmission digital data stream inputted from the signal path 116 is written in parallel at a write bit address (WR BIT ADDR) designated by the address counter 134 with the transition timing of the write clock (WR CLK). The address counter 134 automatically increments the value of the write bit address by the number of write bits (which is 16 in this example) on each writing of data. As a result, the transmission digital data is buffered in a form of a serial FIFO having a 1024-bit length in the memory 131. However, by returning the address value of the address counter 134 to an initial address of the memory 131 when the value of the write bit address reaches the maximum value of the memory address, a serial FIFO circularly using the memory area can be formed in the memory 131.

In the delay value setting register 136, the number of delay bits (D) given as an amount of delay control from a control line 125 is stored. The subtractor 137 subtracts the number of delay bits D from the write bit address outputted from the address counter 134 and outputs the result of the subtraction as a read bit address (RD BIT ADDR).

With the timing of the transition of the state of the read clock (RDCLK), 16-bit data specified by the read bit address is read out in parallel from the memory 131 to the signal path 130 (d0 to d15). If the value of the number of delay bits D is zero, a 16-bit data block that has been written into the serial FIFO in the write cycle is read out without any modification to the signal path 130 in the next read cycle.

When the value of the number of delay bits D is not zero, a 16-bit data block which begins at an address located D bits before the write bit address is read out to the signal path 130 and converted into a high-speed serial digital signal stream by the multiplexing circuit (MUX) 106 connected to the signal path 130. Consequently, it follows that high-speed serial digital signal stream outputted from the multiplexing circuit (MUX) 106 has been imparted with delay equivalent to D bits compared with the case where the delay control buffer circuit 105 is not provided.

When the capacity of the memory 131, i.e. the bit length in the serial FIFO is 1024 bits and the speed of the high-speed serial digital signal stream is, e.g., 10 Gbit/s, delay which falls within a range equivalent to an optical fiber length of 0 to 24 m can be adjusted. The capacity of the memory 131 may be determined appropriately in accordance with the delay value required by each of the signal paths.

In the optical transmitter 100 of FIG. 1, an amount of delay control for each of the delay control buffer circuits is specified from an external control terminal to the internal processor (CPU) 123 of the optical transmitter 100 via a signal line 124, e.g., an I2C (I square C) bus, so that the processor 123 can set the amount of delay control (the number of delay bits D) to each of the delay control buffer circuits via the control lines 125 (125-2 to 125-4). Since a signal delay value in each of the paths seldom varies during the operation of the transmitter, once the value of delay control to be set to each of the delay control buffer circuits is determined, the delay value need not be changed thereafter. Because the number of delay bits D to be set to each of the delay control buffer circuit also depends on the length of an internal optical fiber in the optical transmitter, it may be determined appropriately based on the delay value in each of the signal paths measured in actually assembled optical transmission equipment.

The signal line 124 for connecting the processor 123 to an external control device is not limited to the I2C bus. A signal line of another type such as, e.g., a PCI bus, an Ethernet line, or a maker-specific data line may also be applicable to the signal line 124. It is also possible to adopt a structure in which the amount of delay control is set from the external control device directly to the internal register (non-volatile memory) 136 provided in each of the delay control buffer circuits 105 without intervention of the processor 123.

Next, a description will be given to signal propagation delay in the transmitter 100 by referring to FIG. 1 and FIGS. 5A to 5G. In FIG. 1, following paths exist as a digital signal transfer path.

(1) The first path 114-1 which passes through the parallel precoder 103 for four-level phase modulation, the multiplexing circuit 106-1, and the optical phase modulator 109-1.

(2) The second path 114-2 which passes through the parallel precoder 103 for four-level phase modulation, the multiplexing circuit 106-2, and the optical phase modulator 109-2.

(3) The third path (a path 117-1+the path 114-3) which passes through the parallel precoder 104 for four-level intensity modulation, the multiplexing circuit 106-3, the add circuit 121, and the optical phase modulator 110-1.

(4) The fourth path (a path 117-2+the path 114-3) which passes through the parallel precoder 104 for four-level intensity modulation, the multiplexing circuit 106-4, the add circuit 121, the 6-dB electrical amplifier 120, and the optical phase modulator 110-1.

By providing these signal paths with equal lengths on the axis of signal propagation time, it becomes possible to guarantee a fixed order in a multilevel optically modulated signal for transmission data supplied to the optical modulation unit after dividing into a plurality of digital signal streams.

FIGS. 5A to 5G show timing charts of transferred signals in the first and second signal paths.

Figure 5A:
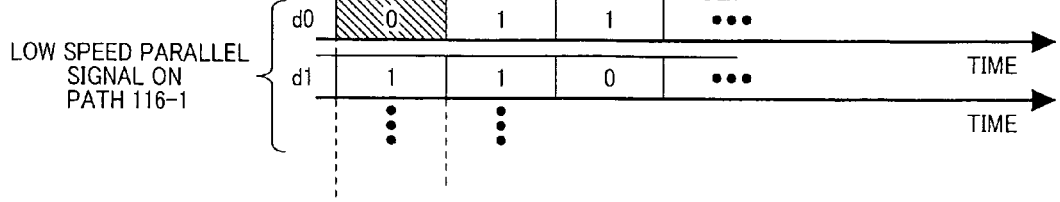
FIGS. 5A to 5G show timing charts of transferred signals in the first and second signal paths of FIG. 1.
Figure 5B:
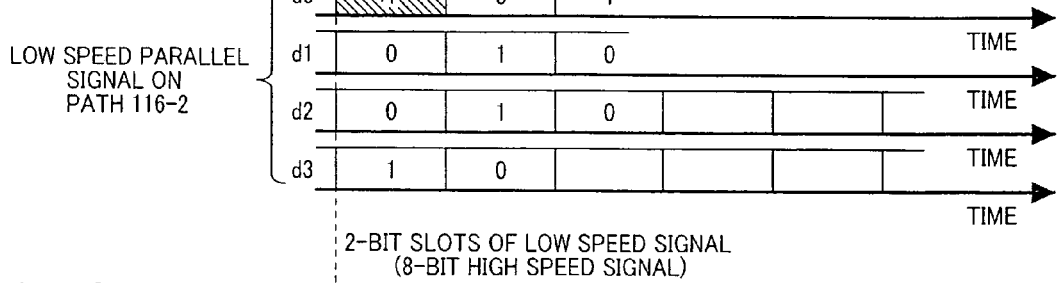

FIG. 5A shows output timings with which the low-speed parallel digital signal stream (d0, d1, . . . ) is outputted from the encoder 103 to the signal path 116-1. FIG. 5B shows output timings with which the low-speed parallel digital signal stream (d0, d1, . . . ) is outputted from the encoder 103 to the signal path 116-2. It is assumed here that the four parallel signals d0 to d3 are outputted as each of the low-speed parallel digital signal streams.

A description will be given next to a delay control operation according to the present invention by focusing attention on two bit data outputted with equal timings from the encoder 103 to the signal line d0, which are indicated in the hatched portions and correspond to the outputs o0 and o1 of the first PSK precoder 126-0 shown in FIG. 3C.

It is assumed here that, due to the presence of the optical fiber line 111-1 and the like, the signal propagation time in the signal path 114-1 is longer than that in the signal path 114-2 by the time equivalent to 9 bits of a high-speed serial digital signal stream, which is equivalent to 18 cm at 10 Gbit/s. The description will be given here to delay control on a bit-by-bit basis. As for accurate delay adjustment within a 1-bit length range, it will be described later by referring to FIG. 16.

Figure 5C:
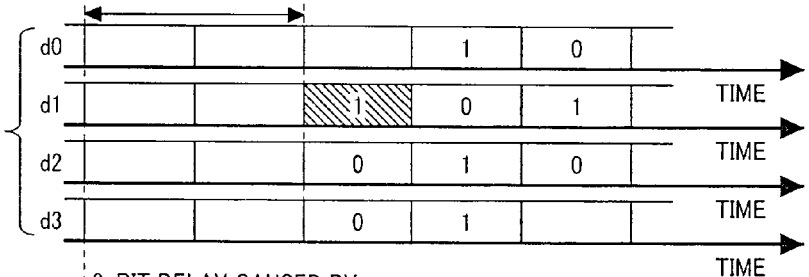

In order to compensate for the difference between the signal propagation times mentioned above, a value "9" is set as the number of delay bits D to the delay value setting register 136 in the delay control buffer circuit 105-2 which is inserted in the second signal path. The delay control buffer circuit 105-2 outputs the low-speed input parallel signal stream after delaying it by the time equivalent to 9 bits of the high-speed serial digital signal stream. As a result, in the output of the delay control buffer circuit 105-2, the bit data "1" in the hatched portion inputted from the signal line d0 is outputted to the signal line d1, which is at a position 1-bit shifted from the signal line d0, with a timing delayed by a time equivalent to 2 bit slots in the low-speed parallel digital signal stream (equivalent to 8 bits of the high-speed serial digital signal), as shown in FIG. 5C.

Figure 5D:
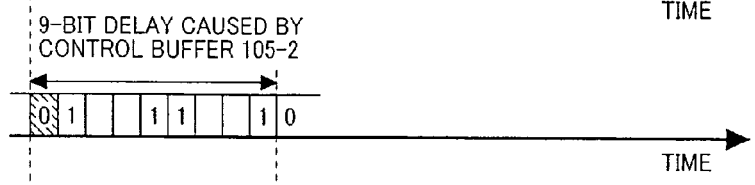
Figure 5E:
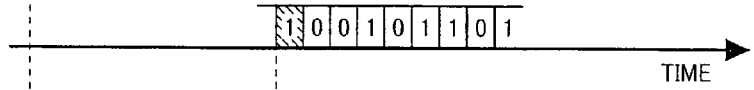

FIGS. 5D and 5E show respective output signals from the multiplexing circuits 106-1 and 106-2. The delays occurring inside the two multiplexing circuits 106-1 and 106-2 are ignored here because they are common to these paths. In this case, as shown in FIG. 5D, the signals in the first and second bit slots on the signal path 116-1 are converted into a high-speed serial digital signal stream having a quadrupled rate by the multiplexing circuit 106-1 and supplied with no delay to the optical phase modulator 109-1. On the other hand, the signals in the first and second bit slots on the signal path 116-2 are subjected to delay control in the delay control buffer circuit 105-2 so that, in the output of the multiplexing circuit 106-2, the bit data "1" in the hatched portion is delayed by 9 bits from the corresponding bit data in the output of the multiplexing circuit 106-1, as shown in FIG. 5E. Although the description has been given here by ignoring the internal delays in the multiplexing circuits 106-1 and 106-2, the difference between the internal delays of the individual circuitry elements belonging to the different paths may also be considered appropriately when determining the number of delay bits D actually.

Figure 5F:
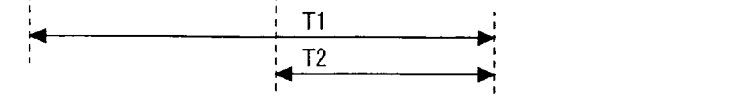
Figure 5G:
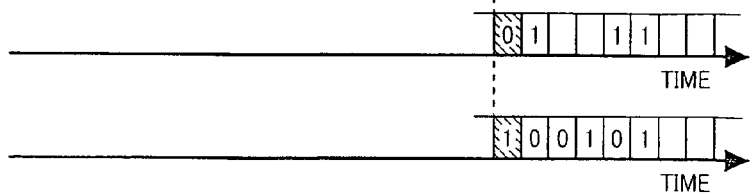

The high-speed serial digital signal stream outputted from the multiplexing circuit 106-1 is supplied to the optical phase modulator 109-1 through the transmission line 107-1 and converted into an optical signal. The optical signal then reaches the optical phase modulator 109-2 via the optical fiber delay line 111-1. The timing with which the transmission signal in the path 114-1 reaches the optical phase modulator 109-2 is shown in FIG. 5F by assuming that the total delay until the signal outputted from the PSK precoder 103 to the path 114-1 reaches the optical phase modulator 109-2 is T1. On the other hand, the timing with which the signal outputted from the multiplexing circuit 106-1 to the path 114-2 reaches the optical phase modulator 109-2 is shown in FIG. 5G by assuming that the delay of the signal on the signal line 107-1 is T2. As can be seen from FIGS. 5E and 5F, if the number of delay bits D (=9 bits) corresponds to the difference between the delay times T2 and T1, both the bits in the hatched portions are outputted with the same timing from the optical phase modulator 109-2.

In the path for the signal outputted from the ASK precoder 104 also, the signal delay value can be adjusted in the same manner as in the second signal path 114-2 by using the first signal path 114-1 as the reference. Thus, in the optical transmitter 100 shown in FIG. 1, even when the serial transmission digital signal is subjected to serial-parallel conversion and supplied as N-bit parallel signals to the input terminals 101-1 to 101-4, it is able to make each group of N bits even in output timings at the position of the final modulator 110 in the optical modulation unit.

In the optical transmission equipment according to the present invention, another encoding format such as, e.g., FEC coding or frame generation other than the PSK preceding and the ASK preceding described above is also applicable as the encoder. Although the intensity modulated signal as a part of the multilevel code is subjected to an arithmetic operation (add operation) in the state of the high-speed serial signal in FIG. 1, all encoding processes may be performed in the state of the low-speed parallel signals, as will be obvious from the following other embodiments. Although the present embodiment has described the optical transmitter comprising a plurality of encoders of different types, such as the parallel precoder 103 for four-level phase modulation and the parallel precoder 104 for four-level intensity modulation, the delay control according to the present invention is also effective in an optical transmitter comprising either one of the PSK precoder 103 and the ASK precoder 104 of FIG. 1.

Next, a description will be given to an embodiment of an optical receiver 200 suitable for the receiving of a multilevel optical modulated signal (four-level phase modulation+four-level intensity modulation) transmitted from the optical transmitter 100 described above.

Figure 6:
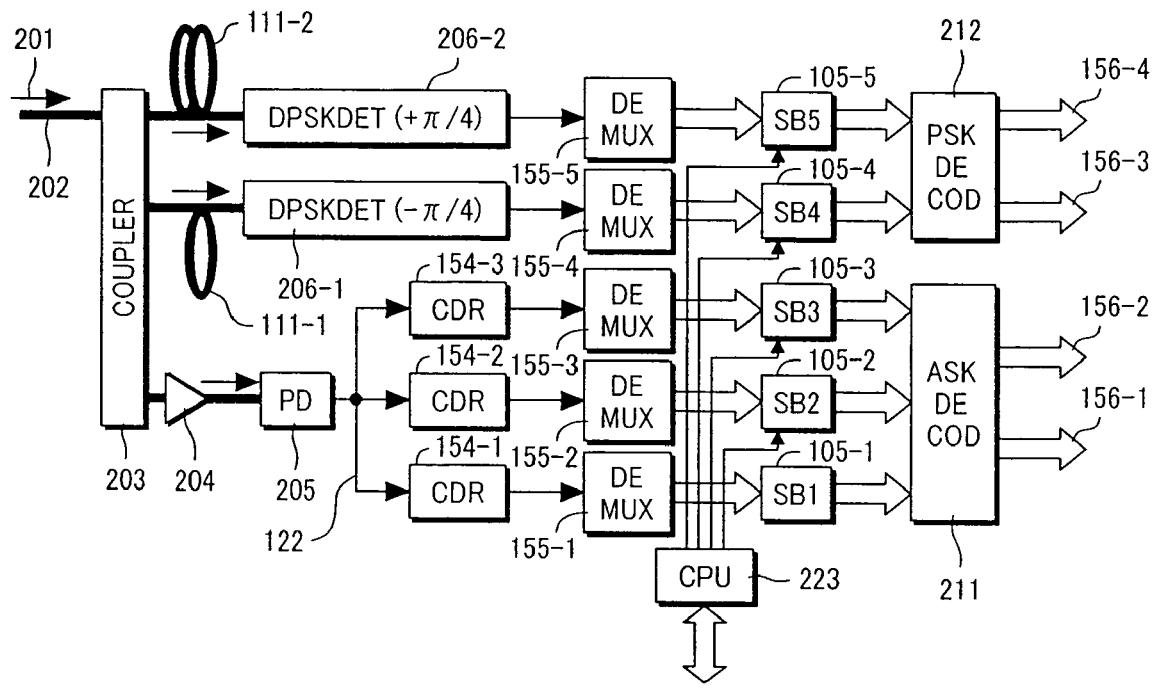
FIG. 6 is a structural view showing a first embodiment of an optical receiver to which the present invention has been applied.

FIG. 6 shows the structure of the principal portion of the optical receiver 200.

Input light 201 from an optical fiber 202 is separated into first, second, and third divided lights (optical signals) by an optical coupler 203. The first and second divided lights are supplied to differential phase detectors 206-1 and 206-2 via the optical fiber connection lines 111-1 and 111-2. The differential phase detectors 206-1 and 206-2 have respective detecting phases set to $-\pi/4$ and $+\pi/4$ and extract phase components perpendicular to each other from the received lights. The differential phase detectors 206-1 and 206-2 convert the optical signals of the specified phase components having been extracted into electric high-speed serial digital signal stream and output the electric signal streams to demultiplexers 155-4 and 155-5, respectively.

FIG. 7 shows the structure of the differential phase detector 206-2.

The input light 201 from the input optical fiber 202 is supplied to a 1-bit delayed interferometer 213 and diverges into first and second optical paths by an optical coupler 193-1.

The first optical path included an optical circuitry 214 for delaying the optical signal by 1 bit and a π/4 optical phase shifter 195. The first and second optical paths are coupled to each other with an optical coupler 193-2 and divided again into two optical paths to be connected to a balanced optical detector 215. Consequently, the optical signal delayed by 1 bit +π/4 that has passed through the first optical path and the optical signal that has passed through the second optical path are supplied to the balanced optical detector 215 after interfering with each other on passing through the optical coupler 193-2.

These two input light signals are differentially detected by the balanced optical detector 215 and converted into a high-speed serial digital signal stream by a clock extraction and data recovery circuit (CDR) 154 connected to the balanced optical detector 215. The amount of phase shift in the optical phase shifter 195 is variable and can be set to an arbitrary value. Accordingly, the function of the differential phase detectors 206-1 is realized by adjusting the amount of phase shift to −π/4.

Returning to FIG. 6, the first and second high-speed serial digital signal streams outputted from the differential phase detectors 206-1 and 206-2 are inputted to the demultiplexers 155-4 and 155-5 to convert them into low-speed parallel signal streams, and supplied to a parallel decoder (PSK decoder) 212 via the delay control buffer circuits 105-4 and 105-5, respectively.

On the other hand, the third divided light branched at the coupler 203 is amplified by an optical fiber amplifier 204, and converted into an electric signal variable in accordance with the intensity component of the input light by a photo diode 205. The output of the photo diode 205 diverges into three signal paths and converted into high-speed serial digital signal streams by first, second, and third clock extraction and data recovery circuits (CDRS) 154-1 to 154-3. The high-speed serial digital signal streams outputted from the CDRs 154-1 to 154-3 are converted into low-speed parallel signal streams by demultiplexers 155-1 to 155-3 and supplied to a parallel decoder (ASK decoder) 211 via delay control buffer circuits 105-1 to 105-3, respectively.

The delay control buffer circuits 105 (105-1 to 105-5) are inserted to eliminate the difference among signal delays in the plurality of signal paths extending from the input terminal 202 for the optical signal to the decoder 211 or 212, similarly to the delay control buffer circuits 105 (105-1 to 105-4) in the optical transmitter 100 described above. To each of the delay control buffer circuits 105, an amount of delay control (the number of delay bits D) is set via the internal processor 223 of the optical receiver 200.

According to the optical receiver 200 of the present embodiment, since these delay control buffer circuits 105 can adjust the amount of signal delay for each of the paths, the multilevel reception signal received as the input light 201 can be outputted with the same timing to output terminals 156-1 to 156-4 even when there is time difference among signal propagation times on the first and second optical paths, each of which passes through the optical fiber line 111 (111-1 or 111-2) and the optical phase detector 206 (206-1 or 206-2), and on the third optical path passing through the optical fiber amplifier 204, and even when there is time difference between signal delays on the electric signal lines located in the post stages of these optical paths inside the optical receiver.

Next, a description will be given to the operation of discriminating a four-level intensity modulated signal based on the third divided light and to the operation of the ASK decoder 211 by referring to FIGS. 8A and 8B, and FIGS. 9A to 9G.

Since the operation of the PSK decoder 212 is well known, its detailed description will be omitted here.

FIG. 8A shows the receiving waveform of the four-level intensity modulated signal contained in the third divided light. The four-level intensity modulated optical signal transmits 2-bit information at the four signal intensity levels of L0, L1, L2, and L3. To the clock extraction and data recovery (CDR) circuits 154-1 to 154-3 to which the result of the O/E conversion of the third divided light is inputted, level values th1, th2, and th3 corresponding to the three eye openings of the four-level intensity modulated signal have been set as their respective discrimination threshold levels. Each of the CDR circuits 154-$j$ ($j$=1 to 3) discriminates "1" or "0" of an input signal based on the pre-set threshold level value "thj" and outputs the result of the discrimination as a high-speed serial digital signal stream. Each of the CDR circuits 154-$j$ may also digitize the input signal by sharing a reference clock signal extracted by another clock extraction circuit prepared separately.

FIG. 8B is a truth table representing the function of the four-level intensity modulated signal decoder (ASK decoder) 211. The inputs i0, i1, and i2 shown herein represent the values of input signals supplied from the CDR circuits 154-1 to 154-3.

The ASK decoder 211 decides the level L0, L1, L2, or L3 of the four-level intensity modulated optical signal by combining the results of the decisions by the CDR circuits 154-1 to 154-3. The result of the decision is outputted as 2-bit information "o0" and "o1" to the output signal paths 156-1 and 156-2. As is obvious from this example, the decoder used in the optical receiver may have different numbers of input/output signals.

FIGS. 9A to 9G show timing charts for illustrating the functions of the delay control buffer circuits 105-4 and 105-5 applied to the optical receiver 200.

FIG. 9A shows high-speed serial digital signal streams outputted from the differential phase detectors 206-1 and 206-2. FIG. 9B shows high-speed serial digital signal streams outputted from the CDR circuits 154-1 to 154-3.

It is assumed here that the output signal of the differential phase detector 206-2 has a delay equivalent to 1.3 bits (130 ps when the bit rate of the high-speed serial signal stream is assumed to be 10 Gbit/s) from the output signal of the differential phase detector 206-1 used as the reference. For simplification of description, it is also assumed that the output signals from the CDR circuits 154-1 to 154-3 are synchronized with each other and delayed by 4.2 bits (420 ps) from the output signal of the differential phase detector 206-1. In this case, the phase modulated signal component and the intensity modulated signal component that have been outputted simultaneously from the optical coupler 203 are inputted to the demultiplexers (DEMUX) 155-1 to 155-5 with timings shifted from each other, as shown by the hatched bits in FIGS. 9A and 9B.

For simplification of description, it is assumed here that each of the demultiplexers 155-1 to 155-5 outputs their input data to the four signal lines (d0, d1, d2, and d3) by time-division demultiplexing in synchronization with the inputted high-speed serial digital signal stream. For example, as shown in FIG. 9C, the demultiplexer 155-4 which receives the high-speed serial signal from the differential phase detector 206-1 outputs the values of the first, fifth, ninth, and ... bits of the high-speed serial signal to the signal line d0 and outputs the second, sixth, tenth, and ... bits of the high-speed serial signal to the signal line d1. In short, bit data on every fourth bit included in the high-speed serial signal stream is outputted in succession to each of the output signal lines of the demultiplexer 155-4.

FIG. 9D shows the output signals from the demultiplexer 155-5. Since the high-speed serial signal stream inputted to the demultiplexer 155-5 has a delay of 1.3 bits from the input signals to the demultiplexer 155-4, low-speed serial signals are outputted with a delay of 0.3 bits as the decimal part to the signal lines d0 to d1. The values of the hatched bits of the high-speed serial signal stream appear in the signal line d1 with a delay of 1 bit corresponding to the integral part of the delay.

FIG. 9E shows the output signals from the demultiplexer 155-1. Since the high-speed serial signal stream inputted to the demultiplexer 155-1 has a delay of 4.2 bits from the input signal to the demultiplexer 155-4, low-speed serial signals are outputted with a delay of 0.2 bits as the decimal fraction part to the signal lines d0 and d1. The values of the hatched bits of the high-speed serial signal stream appear in the output signal line d1 in the next time slot (1 bit of the low-speed signal=100 ps×4=400 ps) with a delay of 4 bits corresponding to the integral part of the delay. The output signals from the demultiplexers 155-2 and 155-3 also have the same output timings as shown in FIG. 9E, though the depiction thereof is omitted.

For simplification of description, a description will be given to the case where an amount of delay control (the number of delay bits D) to be set to each of the delay control buffer circuits 105-1 to 105-3 is zero, the amount of delay control equivalent to 4 bits (D=4) of the high-speed serial signal stream is set to the delay control buffer circuit 105-4, and the amount of delay control equivalent to 3 bits (D=3) is set to the delay control buffer circuit 105-5.

In this case, as shown in FIG. 9F, in the low-speed signals outputted in parallel from the delay control buffer 105-4, the hatched bit of FIG. 9C appears on the signal line d0 with a delay equivalent to 4 bits of the high-speed serial signal stream, i.e., with a delay equivalent to 1 time slot of the low-speed signal. In the low-speed signals outputted in parallel from the delay control buffer 105-5, a delay equivalent to 3 bits of the high-speed serial signal stream from the state of FIG. 9D is observed. Accordingly, the output destination of the hatched bit shifts in such an order that the signal line d1→d2→d3→d0 so that, eventually, the hatched bit appears on the signal line d0 with a delay equivalent to 1 time slot of the low-speed signal, as shown in FIG. 9G.

As a result, the plurality of information bits that has passed through the optical coupler 203 and has been subjected to the multi-level optical modulation are supplied to the decoders 211 and 212 in the state in which the relative position and the time slots as parallel data are matched with each other. As a result, each of the decoders can correctly decode the multi-level reception signal by latching input data at the sampling time t approximately corresponding to the center of each of the time slots.

By compensating for delay within the 1-bit range of the high-speed digital signal stream with the latch circuit of each of the decoders, the accuracy of the delay control by the delay control buffer circuits 105 is sufficient if it is on the order of the bit of the high-speed digital signal stream. The same amount of delay control may be set appropriately to a plurality of paths expected to have substantially the same delay, such as the delay control buffers 105-1 to 105-3 according to the present embodiment. In this case, the bit address register for use in data reading/writing from/to the delay control buffers can be shared by the plurality of delay control buffers. The range of adjustment with respect to timing accuracy and delay within a bit-length range is variable depending on a clock speed used in the individual units of the transmitter/receiver.

In the optical transmission equipment according to the present invention, the use of the delay control buffers 105 allows compensation for extremely large signal delay equivalent to several hundreds to several thousands of bits at the maximum, which is far beyond the bit order, in a signal path including not only an electric wiring unit but also an optical fiber unit inside the equipment. Accordingly, in the determination of an optimal amount of delay control in each of the signal paths in the optical transmitter and in the optical receiver, an amount of delay control to be set to each of the delay control buffer circuits is measured preferably in the state in which the transmitter is combined with the receiver used as the reference.

Figure 10:
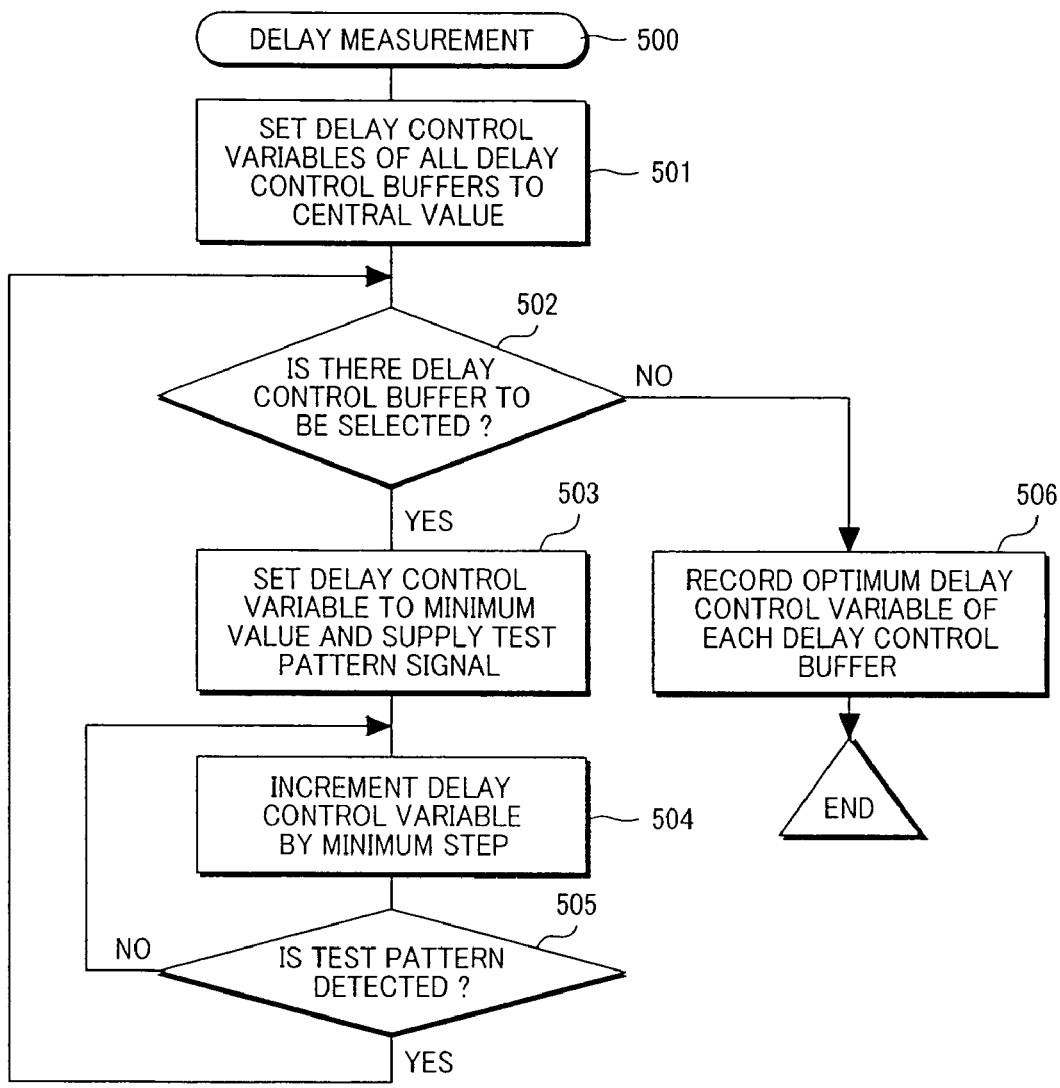
FIG. 10 is a flow chart of a delay measurement routine 500.

FIG. 10 shows an example of a flow chart for a delay measurement routine 500 to be executed to determine the amount of delay control.

The delay measurement routine 500 is executed, for example, after the assembly of the optical transmitter 100 is completed, in the state where the output optical fiber 112 of the transmitter is coupled as the input optical fiber 202 to the optical receiver 220 used as a reference device.

In the case with the optical transmitter 100 of FIG. 1, the amounts of delay control D for all the delay control buffer circuits (variable delay circuits) 105-1 to 105-4 are first set to a specified value, e.g., a central value in a variable range (Step S501). Then, as the delay control buffer circuit to be a measurement target, the delay control buffer circuit 105-1 is selected (502). Digital signals serving as a test pattern are supplied to the input terminals 101-1 to 101-4 for the low-speed parallel digital signals, in the state where the amount of delay control of the delay control buffer circuit 105-1 as the measurement target has been set to a minimum value (503).

Any test pattern may be used appropriately provided that it can be detected as a peculiar pattern at the reference optical receiver side when the amount of delay control for the delay control buffer circuit 105-1 becomes a proper value and the signal delay in the signal path to be the measurement target matches the signal delay in a signal path in which another delay control buffer circuit, e.g., the adjacent delay control buffer circuit 105-2 is located. As the test pattern, a combinational pattern of, e.g., a long pattern with consecutive zeros and a 1-bit-width mark is repeatedly inputted to the input terminals 101-1 to 101-4.

While the data pattern of the low-speed data signals outputted from the reference optical receiver is monitored, the amount of delay control for the delay control buffer circuit 105-1 as the measurement target is incremented by 1 bit in repeated cycles of the test pattern (504) until the peculiar pattern is detected (505). When the peculiar pattern is detected at the reference optical receiver side, the increment of the amount of delay control for the delay control buffer circuit as the measurement target is stopped and a similar operation is repeated by selecting the next delay control buffer circuit 105-2 as the measurement target (502). When the optimal amounts of delay control are determined for all the delay control buffer circuits, the delay values to be set to the delay control buffer circuits are recorded (506), whereby the execution of the measurement routine 500 is completed.

The measurement procedure shown here can be applied to the measurement of an optimal delay value to be set to each of the delay control buffer circuits of the optical receiver by replacing the measurement target and the reference device. The optimal amounts of delay control for the individual delay control buffer circuits thus obtained become control parameters necessary for activating each of the transmitter/receiver so that they are stored in the internal non-volatile memory of the transmitter/receiver. The measured values of the amounts of delay control may also be registered in a database in association with the model name of the optical transmission equipment (optical transmitter and optical receiver) such that they are available via a network as required. The amounts of delay control need not necessarily be measured for all the delay control buffer circuits. For example, the measurement can be omitted for a redundant portion or a buffer circuit expected to have the same value as another buffer already measured.

Instead of executing the measurement routine described above, another method may also be applicable to measure the values of the optimal mounts of delay control, such as a method that calculates delay values in the individual signal paths from design delay values or measured delay values in individual circuitry components or a method that measures delay values in the individual signal paths from output signal waveforms monitored by using an oscilloscope or the like. A specific pattern generator and a peculiar pattern detector, which are needed to execute the measurement routine described above, may be embedded in the optical transmitter/receiver as the measurement target or in the optical transmitter/receiver to be used as the reference device.

As is obvious from the first embodiment described above, by inserting the delay control buffers 105 in the low-speed digital signal units of the optical transmitter and the optical receiver, the present invention allows the adjustment of signal propagation times in a plurality of signal paths including internal optical fiber units with high accuracy of the order of the bit of the high-speed digital signal or within the 1-bit-length range thereof. Consequently, optical transmission equipment for high-accuracy multilevel optical modulation using a plurality of optical modulators can be implemented. Since the delay adjustment can be controlled with electric circuits, the present invention also allows flexible circuit design for each of the signal paths. Further, by mounting programmable encoders and decoders, the present invention can provide versatile optical transmission equipment of which the function can be changed as required.

Embodiment 2

Figure 11:
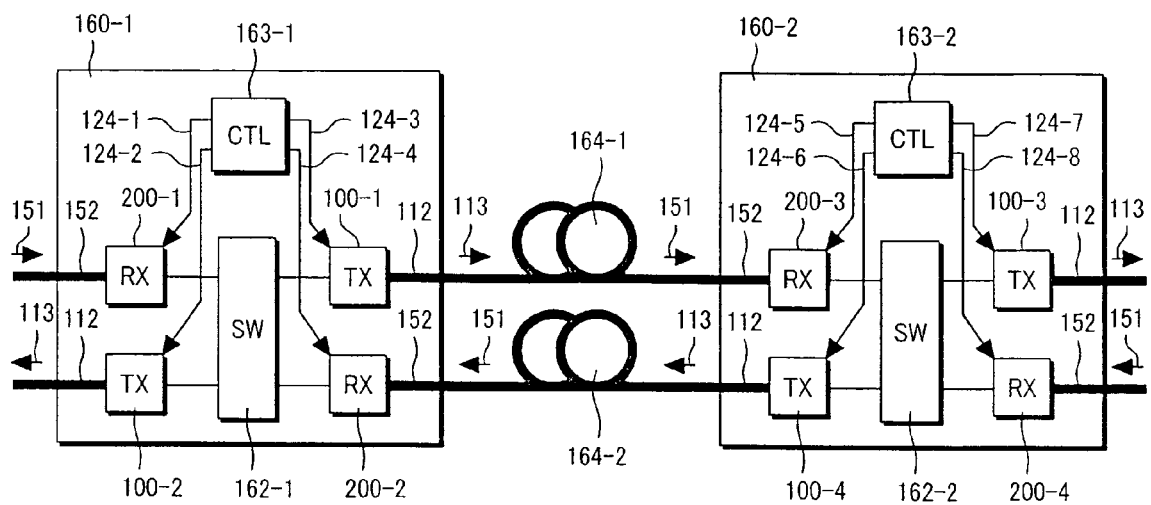
FIG. 11 is a view showing an example of an optical network to which the optical transmission equipment according to the present invention has been applied.

FIG. 11 shows an example of an optical network to which optical transmission equipment 160 according to the present invention have been applied.

Optical transmission equipment 160-1 comprises a plurality of optical transmitters 100 (100-1 and 100-2) and optical receivers 200 (200-1 and 200-2) connected to a switch circuit 162-1. Likewise, optical transmission equipment 160-2 also comprises a plurality of optical transmitters 100 (100-3 and 100-4) and optical receivers 200 (200-3 and 200-4) connected to a switch circuit 162-2. The optical transmitter 100-1 and the optical receiver 200-3, which are in mutually opposing positional relation, and the optical transmitter 100-4 and the optical receiver 200-2, which are also in mutually opposing positional relation, are connected to each other via optical fiber transmission paths 164-1 and 162-2, respectively.

Each of the optical transmission equipment 160 is capable of switching between a working system and a standby system by means of the switch circuits 162 upon the detection of a signal fault. Activation of the optical transmitters 100-1 and 100-2 (100-3 and 100-4) and the optical receivers 200-1 and 200-2 (200-3 and 200-4) is controlled from a control unit 163-1 (163-2) connected thereto via I2C buses 124-1 to 124-4 (124-5 to 124-8).

The switch circuits 162 can be imparted with various functions in accordance with the use purpose of the optical transmission equipment such as an IP router, an IP switch, the SONET ADM (Add/Drop Multiplexer), a ring switch, and a simple regenerator. The optical network can also be formed into various type of configurations by combining plural sets of transmission equipment 160, such as a ring-type configuration, a hub-type configuration, a star-type configuration, a mesh-type configuration, and an optical add/drop-type configuration.

Although the present embodiment includes optical transmitters 100 and optical receivers 200 independently, each of the optical transmission equipment 160 can includes optical transmitters/receivers to which the present invention has been applied in a form different from that of FIG. 11, for example, a transceiver comprised of a pair of a transmitter and a receiver, a transponder comprised of two pairs of transmitters and receivers, or a form obtained by combining a plurality of transmitters and receivers by wavelength multiplexing or in parallel. Each of the optical transmission equipment 160 may include circuitry components such as an optical amplifier, an optical dispersion compensator, an optical switch, or an optical attenuator as necessary, though the depiction thereof is omitted in FIG. 11.

Figure 12:
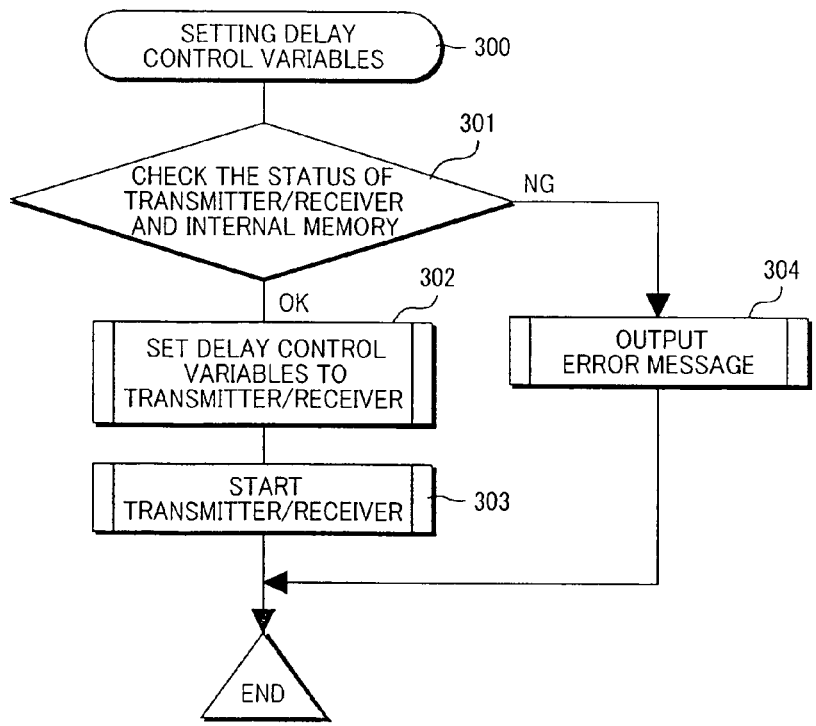
FIG. 12 is a flow chart of a delay control amount setting routine 300.

FIG. 12 shows a flow chart of a delay control setting routine 300 to be executed in each of the optical transmission equipment 160.

The routine 300 is executed by the control units 163 when an activation signal or a reset signal of the transmission equipment is inputted or when a reset signal is inputted to any of the transmitters and receivers for reactivation as a result of the attachment or detachment of a circuit board, fault recovery, or the like in order to reset the amounts of delay control to the transmitter and the receiver.

The control units 163 checks the respective statuses of the transmitter 100 and the receiver 200 and whether or not the amount of delay control (D) to be individually set to the transmitter and the receiver has been prepared in the internal memory of the control unit 163 (Step 301). If there is a fault, the control unit 163 outputs the occurrence of an error to a display screen or notifies a control terminal of the fault (304), and terminates the routine. Instead of reading the amounts of delay control from the internal memory of the control units 163, it is also possible to read out the amounts of delay control from a non-volatile memory or a hard disk provided in each of the optical transmission equipment. The amounts of delay control may also be inputted manually by an operator or acquired from a database via a network not shown. If the respective statuses of the transmitter 100 and the receiver 200 and the amounts of delay control have no problem, the control unit 163 sets the amounts of delay control to the target optical transmitter and receiver via the I2C buses 124 (302) and activates the optical transmitter and receiver (303).

Embodiment 3

Figure 13:
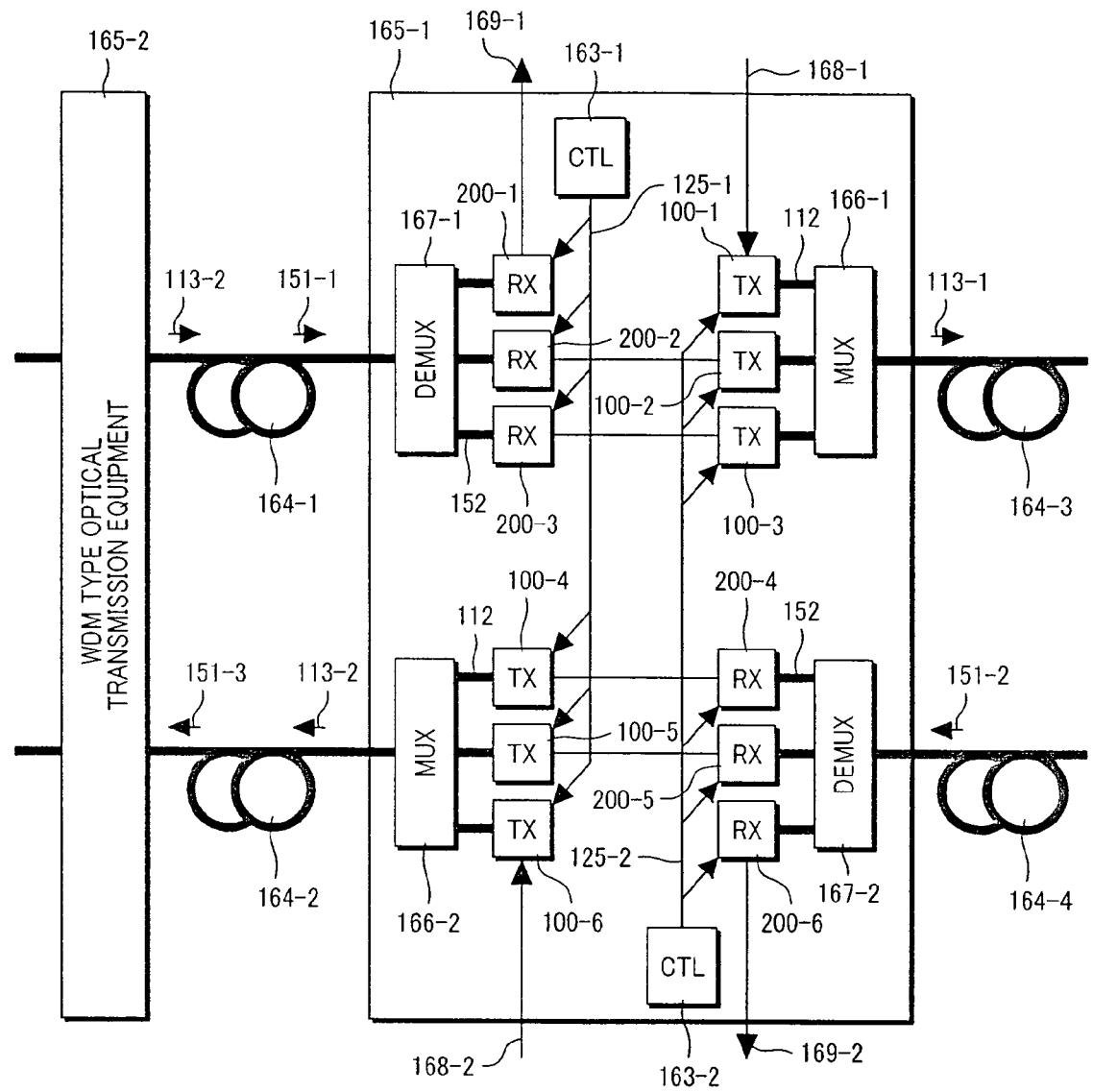
FIG. 13 shows an example of an optical network comprised of a WDM type optical transmission equipment to which the present invention has been applied.

FIG. 13 shows an example of an optical network comprised of WDM type optical transmission equipment 165 (165-1 and 165-2) to which the present invention has been applied.

The optical transmission equipment 165-1 and 165-2 are coupled to each other through an upward optical fiber transmission path 164-1 and a downward optical fiber transmission path 164-2. The optical transmission equipment is further connected to other optical transmission equipment by a pair of upward and downward optical fiber transmission paths, as shown by the optical fiber transmission paths 164-3 and 164-4 in the drawing. Each of the optical fibers transmits three optical signals at different wavelengths as wavelength multiplexed optical signals.

As shown in the optical transmission equipment 165-1, each of the optical transmission equipment 165 comprises a plurality of optical receivers (RX) 200 (200-1 to 200-3 and 200-4 to 200-6) each coupled to the receiving-side optical fiber transmission path via optical a wavelength demultiplexer 167 (167-1 and 167-2), and a plurality of optical transmitters (TX) 100 (100-1 to 100-3 and 100-4 to 100-6) each coupled to the transmitting-side optical fiber transmission path via an optical wavelength multiplexer 166 (166-1 and 166-2), in the upward and downward directions.

For example, a wavelength multiplexed optical signal 151-2 inputted from the optical fiber transmission line 164-4 is divided into three optical signals at different wavelengths by the optical wavelength demultiplexer 167-2 and inputted to the optical receivers 200-4 to 200-6. In the example shown here, the optical signals received by the optical receivers 200-4 and 200-5 are transferred to the optical transmitters 100-4 and 100-5, while the optical signal received by the optical receiver 200-6 is outputted as a drop signal 169-2 to a branch line of the optical transmission equipment. On the other hand, an add signal 168-2 inputted from another branch line of the optical transmission equipment and a reception signal from the upward direction are converted to optical signals at different wavelengths by the optical transmitters 100-4 to 100-6, wavelength multiplexed by the optical wavelength multiplexer 166-2, and outputted to the downstream optical fiber transmission path 164-2. The same signal transmission/reception is also performed between the optical fiber transmission paths 164-1 and 164-3.

In the present embodiment, respective control units 163 (163-1 and 163-2) are provided for the upward and downward optical fiber transmission systems so that each of the control units 163 performs activation control and the setting of the amounts of delay control with respect to the optical transmitters and receivers belonging to the individual systems.

Embodiment 4

Figure 14:
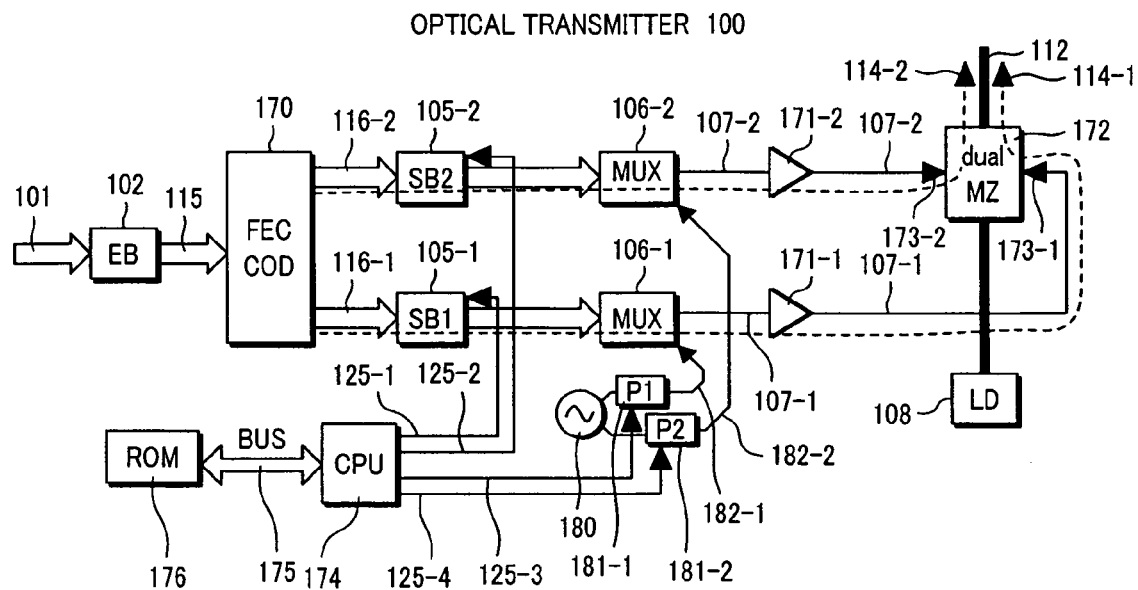
FIG. 14 is a structural view showing another embodiment of the optical transmitter to which the present invention has been applied.

FIG. 14 shows an example of the application of the delay control buffer circuits 105 to an NRZ optical transmitter comprising a dual-arm driven optical modulator 172.

Low-speed digital data signals inputted in bit parallel relation from the input terminal 101 are supplied to a FEC (Forward Error Correction) parallel precoder 170 with their respective phases matched by the parallel buffer circuit 102. The FEC parallel precoder 170 performs frame generation and error correction code generation that are appropriate for long-distance transmission and outputs two streams of parallel low-speed digital signals logically inverted from each other to signal paths 116-1 and 116-2.

These digital signal streams are individually inputted to the delay control buffer circuits 105-1 and 105-2 and supplied to the multiplexing circuits 106-1 and 106-2 in such a state that one of the signal streams is delayed by a specified amount D from the other. If the time difference between the signal propagation times along the two signal paths 114-1 and 114-2, which are indicated by the broken lines extending from the FEC parallel precoder 170 to the optical output terminal, is represented by the number of bits N of the high-speed serial digital signal stream, the delay value D described above corresponds to the integral part of N. The parallel low-speed digital signals outputted from the delay control buffer circuits 105-1 and 105-2 are converted into the high-speed serial digital signal streams by the multiplexing circuits 106-1 and 106-2 and amplified by driver circuits 171-1 and 171-2 having in-phase amplification properties. The output signals from the driver circuits 171-1 and 171-2 are supplied to modulated signal input terminals 173-1 and 173-2 of the dual-arm driven optical modulator 172.

Numeral 180 denotes a clock generator for generating high-speed clocks serving as the transmission rates of the high-speed serial digital signal streams. Numerals 181-1 and 181-2 denote variable phase adjusters (P1 and P2) for adjusting the phases of two sequences of high-speed clock signals outputted from the clock generator 180. The high-speed clock signals subjected to the phase adjustment by the variable phase adjusters are supplied to the multiplexing circuits 106-1 and 106-2 via clock supply lines 182-1 and 182-2. The multiplexing circuits 106-1 and 106-2 output high-speed serial digital signal streams having been subjected to parallel-serial conversion in accordance with the respective high-speed clock signals supplied thereto. By shifting the phases of the high-speed clock signals to be supplied to the multiplexing circuits 106-1 and 106-2, the output timings (delay) of the high-speed series digital signals can be adjusted accurately within a range of 1 clock period, i.e. 1-bit length.

The feature of the present embodiment resides in that delay is controlled bit-by-bit by the delay control buffer circuits 105-1 and 105-2 and delay within a range of ±1 bit is controlled by an accurate adjustment unit comprised of the phase adjusters 181 (181-1 and 181-2) and the multiplexing circuits 106 (106-1 and 106-2), thereby implementing a wide range of delay control with high accuracy. By changing the amounts of delay control to be given to the phase adjusters 181-1 and 181-2, the accurate adjustment unit can control a delay value within a 2-bit-length range at the maximum.

The setting of the amounts of delay control to the variable phase adjusters 182-1 and 182-2 and to the delay control buffer circuits 105-1 and 105-2 is performed by a processor (CPU) 174 via the control signal lines 125-1 to 125-4. The amounts of delay control to be set have been stored preliminarily in association with the individual signal paths in a non-volatile memory 176.

Figure 15:
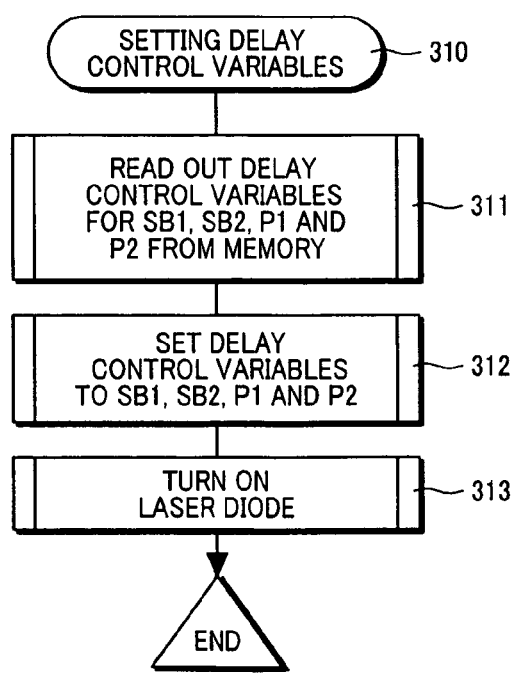
FIG. 15 is a flow chart of a delay control amount setting routine 310 applicable to the embodiment of FIG. 14.

FIG. 15 shows a flow chart for a delay control setting routine 310 to be executed by the processor 174 in the present embodiment. The routine is executed when the optical transmitter 100 is activated after the power supply or when a reset signal is inputted from the outside.

The processor 174 reads out the amounts of delay control preliminarily stored in the non-volatile memory 176 via a bus 175 (Step 311), sets the respective amounts of delay control to the buffer circuits 105-1 and 105-2 and to the variable phase adjusters 181-1 and 181-2 via the control signal lines 125-1 to 125-4 (312), and activates a semiconductor laser 198 to turn ON the optical output (313). It is also possible to set the amounts of delay control by repeating Steps 311 and 312 for each of the signal paths and activate the semiconductor laser 198 when the setting of the amounts of delay to all the signal paths is completed.

Figure 16A:
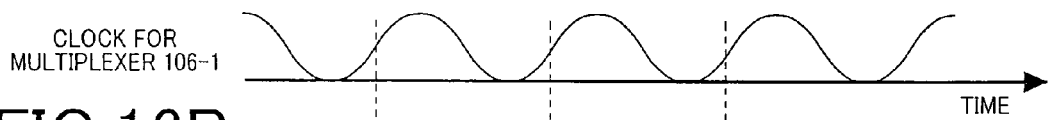
FIGS. 16A to 16F show timing charts of signals each for illustrating accurate delay adjustment applicable to the embodiment of FIG. 14.
Figure 16B:
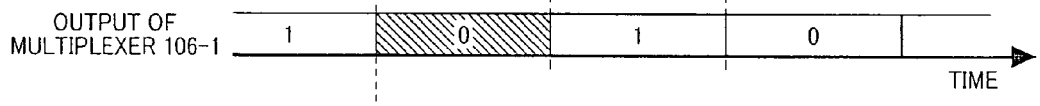
Figure 16C:
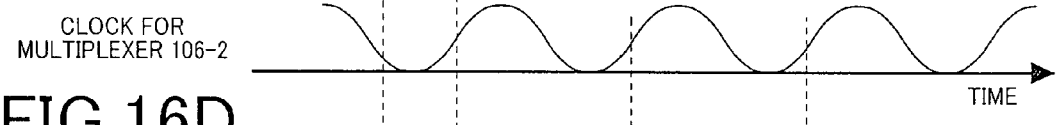
Figure 16D:
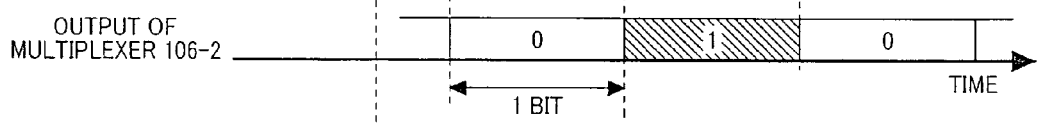

FIGS. 16A to 16F show signal timing charts for illustrating accurate delay adjustment performed in the multiplexing circuits 162-1 and 162-2 in the present embodiment. FIG. 16A shows a clock to be supplied to the multiplexing circuit 106-1. FIG. 16B shows the timing of the high-speed serial signal stream outputted from the multiplexing circuit 106-1. FIG. 16C shows a sequence of clocks to be supplied to the multiplexing circuit 106-2. FIG. 16D shows the timing of the high-speed serial signal outputted from the multiplexing circuit 106-2. It is assumed that the value of data outputted from each of the multiplexing circuits is changed upon the rising edge of the supplied clock signal, as indicated by the broken lines.

For convenience of description, it is assumed that the speed of the high-speed serial digital signal stream outputted from each of the multiplexing circuits is 10 Gbit/s (1 bit=100 ps), the value of signal delay T1 on the output signal line 107-1 of the multiplexing circuit 106-1 is 2.3 bits (230 ps), and the value of signal delay T2 on the output signal line 107-2 of the multiplexing circuit 106-2 is 0.9 bits (90 ps). However, these delay values may be any in an actual situation. In this case, a delay time difference corresponding to T1−T2=1.4 bits occurs between the output signal lines 107-1 and 107-2 of the multiplexing circuits 106-1 and 106-2. The time difference between the two digital signal streams arriving at the modulator 172 is absorbed by preliminarily delaying the high-speed serial signal stream outputted from the multiplexing circuit 106-2 to the signal line 107-2 by an extra time equivalent to 1.4 bits.

In the present embodiment, 1-bit delay corresponding to the integral part of the objective delay value (1.4 bits) is given to an output signal from the encoder 170 by using the delay control buffer circuit 105-2 and the clock to be supplied to the multiplexing circuit 106-2 is delayed by 0.4 bits corresponding to the decimal fraction part of the objective delay value as shown in FIG. 16D, thereby causing, at the time of passing through the multiplexing circuits, the time difference equivalent to 1.4 bits between a pair of inverted codes (hatched portions) that have been simultaneously outputted from the encoder 170.

Figure 16E:
Figure 16F:
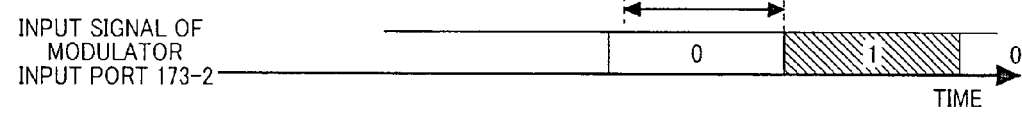

Since 2.3 bits of delay is given to the output signal from the multiplexing circuit 106-1 shown in FIG. 16B during when it passes through the signal line 107-1, this signal arrives at the input terminal 173-1 of the dual-arm driven optical modulator 172 with the timing shown in FIG. 16E. On the other hand, 0.9 bits of delay is given to the output signal from the multiplexing circuit 106-2 shown in FIG. 16D during when it passes through the signal line 107-2, this signal arrives at the input terminal 173-2 of the modulator 172 with the timing shown in FIG. 16F. Therefore, as is obvious from the bits in the hatched portions, the pair of codes outputted from the encoder 170 in mutually inverted relation are supplied simultaneously to the dual-arm driven optical modulator 172 to modulate optical signals.

The high-speed serial digital signal streams to be supplied to the input terminals 171-1 and 171-2 of the dual-arm optical modulator 172 are sufficient to be eventually in mutually inverted relation. Accordingly, a circuit structure may also be adopted which applies, e.g., anti-phase amplifiers to the driver circuits 171-1 and 171-2 such that identical low-speed parallel signals are outputted from the encoder 170 to the signal lines 116-1 and 116-2. As the encoder 170, one of a 8B10B encoder and a 64B66B encoder, each having no FEC function, and a SONET frame generator is applicable instead of the FEC parallel precoder 170. It is also possible to construct an optical duobinary transmitter as a whole by applying a duobinary precoder as the encoder 170 and inserting a generator of a duobinary three level signal in each of the signal lines 107-1 and 107-2.

As the variable phase adjusters 181 (181-1 and 181-2) to be used for the accurate adjustment of delay within a 1-bit range, various types of adjusters including a combination of a voltage controlled semiconductor phase shifter and a variable digital voltage generator and an adjuster which drives a motor-driven variable delay line by using a stepping motor can be used. A structure may also be considered that applies well-known variable delaying means instead of the delay control buffer circuit 105 in at least one of the signal lines 107-1 and 107-2 and performs the accurate adjustment of delay by using the variable phase adjusters 181 and the multiplexing circuits 106. However, adjustment of large delay exceeding the order of several centimeters (which is, e.g., 2 bits at 10 Gbit/s) becomes difficult for normal variable delaying means so that the structure is inferior to the combination of the delay control buffer circuits 105 and the variable phase adjusters 181 as used in the present embodiment. The setting of the amounts of delay control to the variable phase adjusters 181 may be performed by, e.g., an automatic setting method in which the phases within the bit-width range of the digital signals inputted to the modulated signal input terminals 173-1 and 173-2 are detected to perform feedback control over the variable phase adjusters such that the phase difference becomes zero.

In the present embodiment, the frequency of the clock outputted from the clock generator 180 is made equal to the bit rate of the high-speed serial digital signal, which is a symbol rate in the case with a multilevel signal, and the operating speed of each of the delay control buffer circuits 105 is made to be 1/N of the bit rate in the case of using an N-bit parallel input format. However, by adjusting the clock frequency and the operating speed of the delay control buffer circuit such that each of them has a value corresponding to an integral multiple or integral fraction of the value used in the present embodiment, it becomes possible to change the control range and setting accuracy of delay values in the delay control buffer and the accurate delay adjustment unit.

For example, when the clock frequency is adjusted to ¼ of the bit rate of the high-speed serial digital signal, the range of adjustment in the accurate adjustment unit can be enlarged to 4 bits. Conversely, by adjusting the operating frequency of each of the delay control buffer circuits 105 to 8 times the original value, the accuracy of delay control in the delay control buffer circuit can be improved to ⅛. In this case, the delay control by the accurate adjustment unit becomes unnecessary.

Since the dual-arm optical modulator 172 does not necessarily need an optical fiber to be provided therein, there has conventionally been adopted a structure in which two streams of high-speed signals obtained from the positive phase output terminal and inverted phase output terminal of a driver circuit are inputted to the two input terminals of the optical modulator. However, if the propagation delay times of the two high-speed signal streams are desired to match precisely with accuracy of about 1/10 bits, the placement flexibility of signal lines and components in the transmitter and the receiver is limited and how to handle an excess length of each of the transmission lines of the high-speed signals presents a problem. When variable delay lines are used to adjust the delay time difference between the two high-speed digital signal streams, delay adjustment with high accuracy within a 1-bit-length range is not easy so that the problems of increased manufacturing cost and increased apparatus size are encountered. By contrast, even when the delay time difference equivalent to the 1-bit length or more occurs between the paths of the high-speed digital signals, the structure according to the present embodiment allows easy absorption of the delay time difference by applying the delay control buffer circuits 105 and combining the accurate delay adjustment unit with the delay control buffer circuits as necessary and thereby provides a low-cost and small-size optical transmitter.

Embodiment 5

Figure 17:
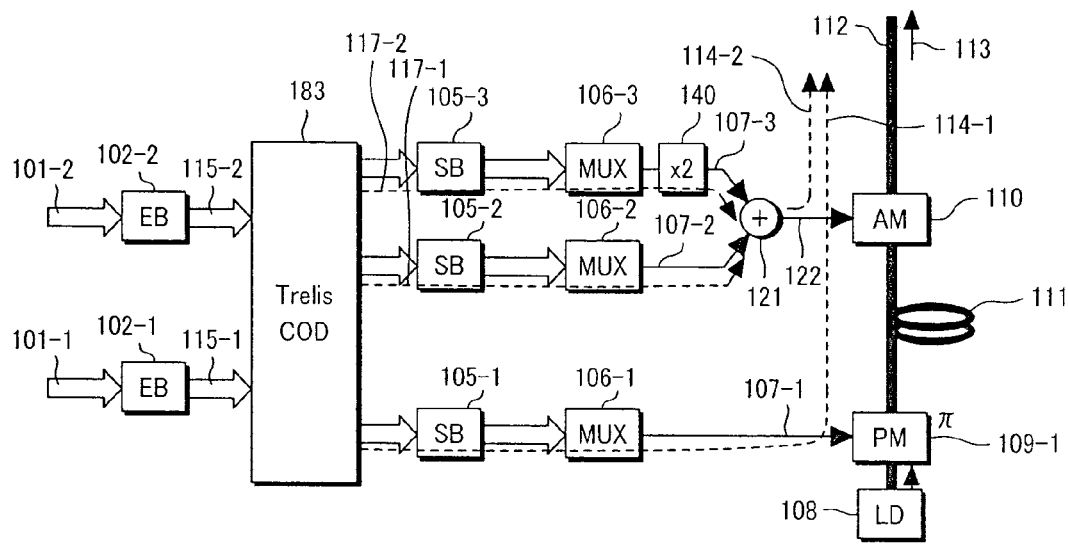
FIG. 17 is a structural view showing still another embodiment of the optical transmitter to which the present invention has been applied.

FIG. 17 shows an example of the application of the present invention to a multilevel optical transmitter using a Trellis code.

The Trellis code is a code for multilevel signal that can reduce the number of states of a multilevel signal to be used for information transmission and perform error correction by using the number of extra redundant states. In the optical transmitter 100 shown in FIG. 17, the Trellis code is implemented by mapping two streams of data signals (the number of states is the square of 2=4) inputted from the parallel input terminals 101-1 and 101-2 to an 8-level of multilevel signal by using a Trellis coder 180. The low-speed parallel signal streams inputted from the parallel input terminals 101-1 and 101-2 have their respective timings matched by the parallel buffer circuits 115-1 and 115-2 and are inputted to the Trellis coder 180. The Trellis coder 180 converts the 4-level input signals to an 8-level Trellis code and outputs the code to three signal paths 117-1, 117-2, and 114-1 together with an error correction code. Since these signal paths have the same structures as the signal paths of FIG. 1 including the delay control buffer circuits 105-2 to 105-4, the description of the detailed operation will be omitted here.

Thus, according to the present invention, the number of the low-speed parallel digital signals inputted to the encoder may be different from the number of the low-speed parallel digital signals outputted from the encoder. Moreover, the numbers of the parallel bits and the bit rates of the input/output signals of the encoder may be different from each other.

Embodiment 6

Figure 18:
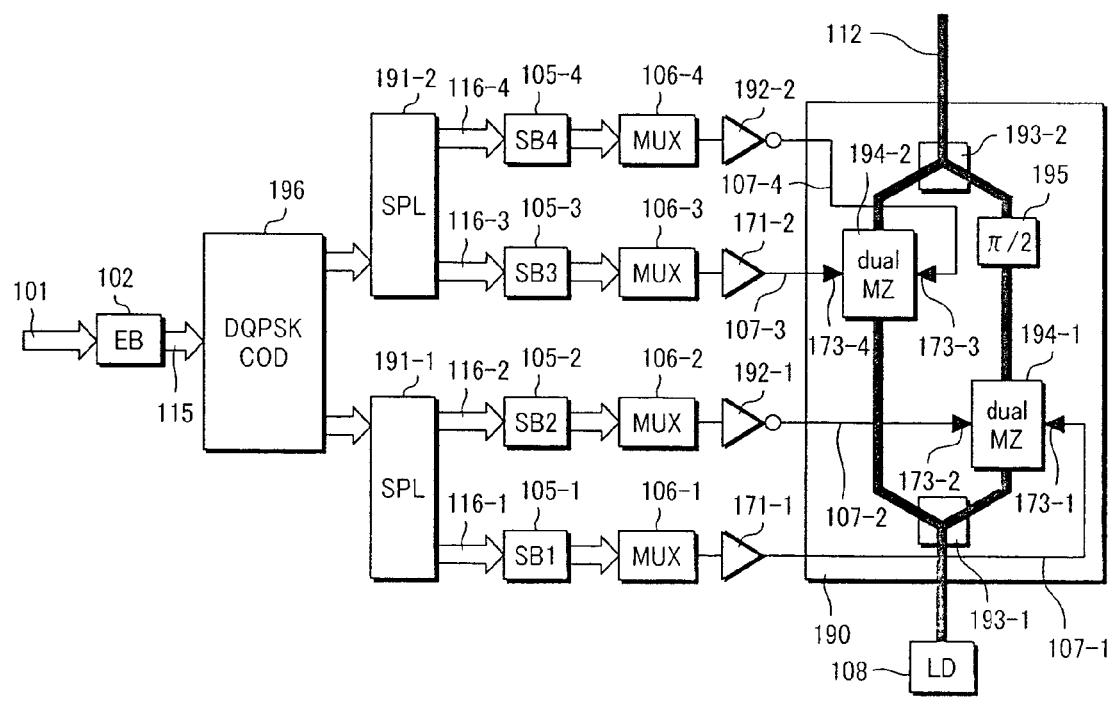
FIG. 18 is a structural view showing yet another embodiment of the optical transmitter to which the present invention has been applied.

FIG. 18 shows an example of the application of the present invention to an optical transmitter comprising an optical IQ modulator 190 for independently modulating the in-phase component and quadrature-phase component of an optical signal.

The present embodiment shows an example of 4-level optical DQPSK (4-level differential phase) modulation. 16-parallel low-speed digital signals inputted to the parallel input terminal 101 have their timings matched by the parallel buffer 102. After that, the 16-parallel low-speed digital signals are subjected to differential encoding by a parallel precoder (DQPSK) 196 for 4-level differential phase modulation and outputted as two streams of 8-bit-parallel low-speed digital signals.

Each of the two streams of low-speed parallel digital signals outputted from the encoder 196 is further separated into a pair of low-speed parallel digital signal streams by splitter 191-1 or 191-2 and subjected to delay control by the delay control buffer circuits (105-1 to 105-4). Each of the low-speed parallel digital signal streams subjected to delay control is converted into a high-speed serial digital signal stream by the multiplexing circuit 106 (106-1 to 106-4). One of each pair of the high-speed serial digital signal streams is inputted to the driver circuit 171 (171-1 or 171-2) and the other of the pair is inputted to an inverting driver circuit 192 (192-1 or 192-2) so that they are inputted as anti-phase drive signals to the optical IQ modulator 190 via the signal line 107-1 (or 107-3) and 107-2 or 107-4).

In the optical IQ modulator 190, the optical signal outputted from the semiconductor laser 108 is divided into two optical transmission paths by the optical coupler 193-1 and inputted to dual-arm MZ modulators 194-1 and 194-2 inserted in the individual optical transmission paths. Of the two dual-arm MZ modulators, the dual-arm MZ modulator 194-1 performs intensity modulation on the optical signal according to the drive signals inputted from the signal lines 107-1 and 107-2 to the input terminals 173-1 and 173-2. The other dual-phase MZ modulator 194-2 performs intensity modulation on the optical signal according to the drive signals inputted from the signal lines 107-3 and 107-4 to the input terminals 173-3 and 173-4. The output of the optical modulator 194-1 is converted into a signal light having an optical phase difference of 45 degrees with the output light of the optical modulator 194-2 by passing through the optical shifter 195. The two signal lights subjected to the intensity modulation are combined by the optical coupler 193-2 and outputted to the output optical fiber 112.

In a conventional optical IQ modulator 190 of this type, it has been necessary to adjust the respective lengths of the four signal paths including the internal optical transmission paths such that they are equal on a per component basis. By contrast, the present invention allows adjustment of the signal propagation times from the encoder 196 to the respective output terminals of the individual signal paths such that they are equal through delay control by the delay control buffer circuits 105-1 to 105-4. Consequently, the insertion positions of the MZ modulators 194-1 and 194-2 within the optical IQ modulator 190 and the different wiring lengths of the signal paths 107-1 to 107-4, e.g., present no problem.

The present invention is effective not only with the optical DQPSK modulation shown in the present embodiment but also with optical QAM (Quadrature Amplitude Modulation) in which high-speed digital signal streams subjected to multilevel intensity modulation are supplied to the individual input terminals 173 of the optical modulator 194. By converting transmission data into a large-capacity of single optically modulated signal stream and transmitting the optical signal, a link-aggregation function can be implemented which regards the paths extending from the transmitter toward the opposing receiver as one large-capacity link. It is also possible to use high-speed serial signal stream as the input signals to the transmitter and convert the high-speed serial signal stream to low-speed parallel signals by using demultiplexers located immediately before the encoder.

Embodiment 7

Figure 19:
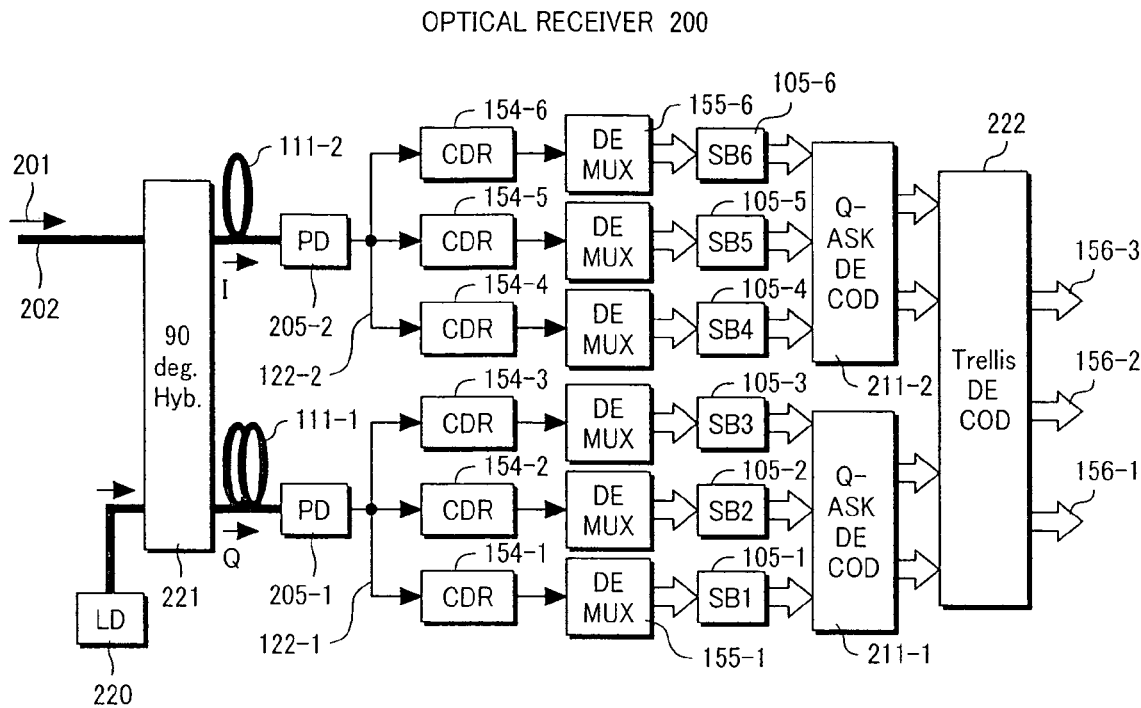
FIG. 19 is a structural view showing still another embodiment of the optical transmitter to which the present invention has been applied.

FIG. 19 shows an example of the application of the present invention to an optical receiver 200 which receives optical signal separated into the in-phase (I) component and the quadrature (Q) component.

The received light 201 inputted from the input fiber 202 is supplied to one of input ports of an optical 90-degree hybrid circuit 221. As a reference light for phase detection, a local oscillator laser light outputted from a semiconductor laser diode light source 220 is inputted to the other input port of the optical 90-degree hybrid circuit 221. The optical 90-degree hybrid circuit 221 synthesizes these input lights received from the two input ports, outputs the Q-component to the optical fiber connection line 111-1, and outputs the I-component to the optical fiber connection line 111-2.

The optical fiber connection lines 111-1 and 111-2 are coupled to photo diodes 205-1 and 205-2, respectively. If the input light 201 is assumed to be an optical signal subjected to 16-level QAM modulation, a 4-level high-speed serial signal stream of I-component and a 4-level high-speed serial signal stream of Q-component are outputted from the photo diodes 205-1 and 205-2 to the signal lines 122-1 and 122-2, respectively.

The Q-component (I-component) 4-level high-speed serial signal stream is converted into three high-speed serial digital signal streams by clock extraction and data recovery (CDR) circuits 154-1 to 154-3 (154-4 to 154-6) in the same manner as in the processing of the output signal from the photo diode 205 in the optical receiver according to the first embodiment shown in FIG. 6. After passing through demultiplexers 155-1 to 155-3 (155-4 to 155-6) and delay control buffer circuits 105-1 to 105-3 (105-4 to 105-6), these high-speed serial digital signal streams are decoded by a parallel decoder 211-1 (211-2) for Q-component (I-component) 4-level intensity modulation.

In the present embodiment, four streams of low-speed parallel digital signals resulting from the decoding by the parallel decoder 211-1 and 211-2 are further supplied to a Trellis decoder 222 to convert them into three streams of low-speed parallel digital signals and output these low-speed parallel digital signal streams to output signal paths 156-1 to 156-3, respectively. Although the description has been given here to the receiver of the 16QAM signal, the present invention is also applicable to a binary or multilevel ASK/FSK/PSK/QAM or an optical IQ receiver constructed by combining them. It is also possible to increase the number of output ports of the 90-degree optical hybrid to 4 and replace the photo diode 205 with a balanced optical detector.

According to the present embodiment, signal propagation times in the plurality of paths extending from the terminal of the input fiber 202 of the optical receiver to the decoders 211-1 and 211-2 can be set even through delay control by the delay control buffer circuits 105-1 to 105-6.

Embodiment 8

Figure 20:
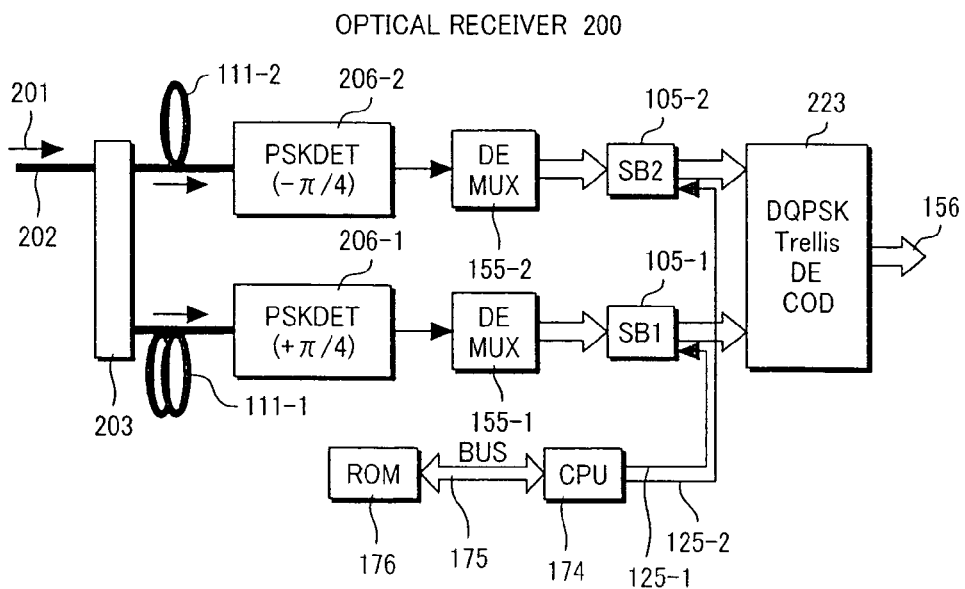
FIG. 20 is a structural view showing yet another embodiment of the optical transmitter to which the present invention has been applied.

FIG. 20 shows an example of the application of the present invention to an optical receiver for differentially receiving an optical DQPSK signal.

In the present embodiment, the received signal light 201 inputted from the input fiber 202 is divided into two signal lights by an optical coupler 203. One of the two signal lights is inputted to a differential phase detector 206-1 having a detecting phase set to $+\pi/4$ through an optical fiber connection line 111-1, while the other signal light is inputted to a differential phase detector 206-2 having a detecting phase set to $-\pi/4$ through an optical fiber line 111-2. Two streams of high-speed serial binary digital signals which are electrically outputted from the differential phase detectors 206-1 and 206-2 are supplied to a differential phase modulation/Trellis decoder 223 via demultiplexers 155-1 and 155-2 and delay control buffer circuits 105-1 and 105-2, respectively.

According to the present embodiment, since respective delay time in the plurality of paths extending from the end of the input fiber 202 to the differential phase modulation/Trellis decoder 223 can be adjusted such that they are equal by using the delay control buffer circuits 105-1 and 105-2, bit information transferred in parallel by the input fiber 202 can be supplied in a correct phase to the differential phase modulation/Trellis decoder 223.

Embodiment 9

Figure 21:
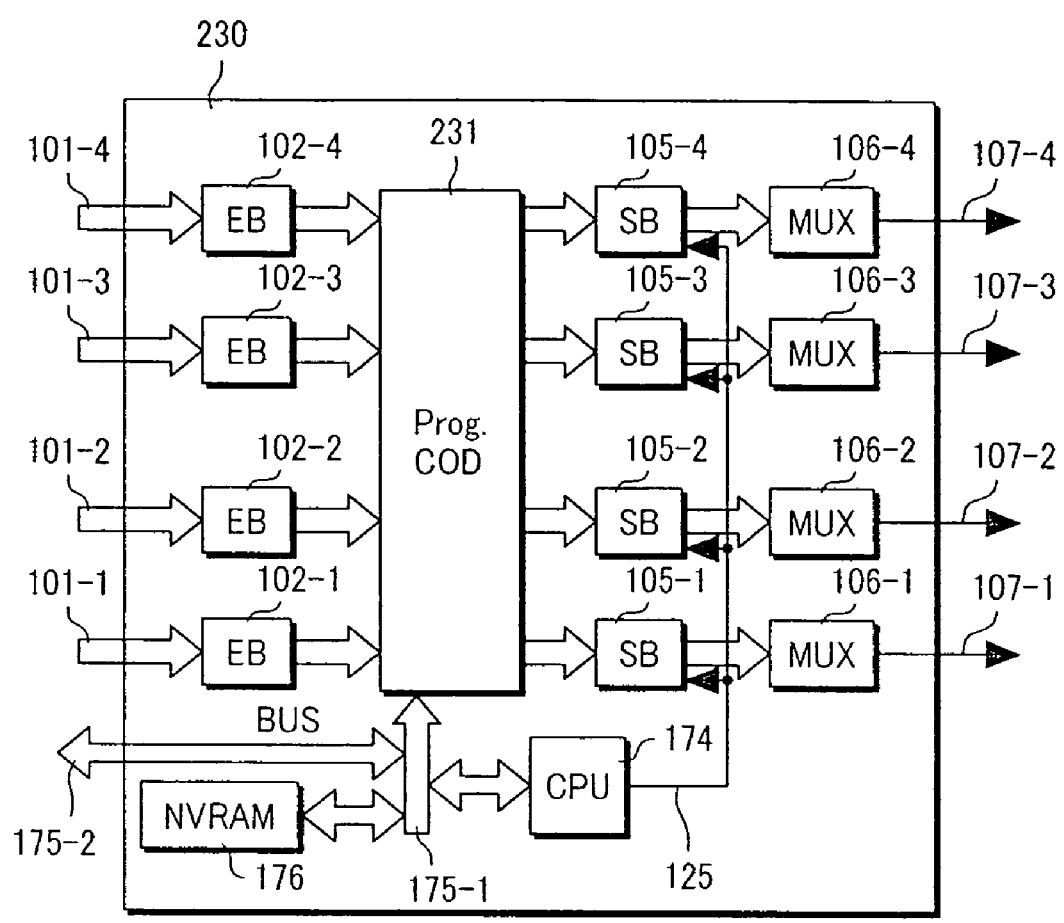
FIG. 21 is a view showing an embodiment of a semiconductor integrated circuit prepared for an optical transmitter according to the present invention.

FIG. 21 shows an example of a semiconductor integrated circuit (IC) 230 prepared for an optical transmitter to which the delay control buffer circuits 105 have been applied.

The IC 230 shown here is comprised of a plurality of parallel input terminals 101-1 to 101-4 to which electric low-speed parallel digital data signals are supplied individually, parallel buffer circuits 102-1 to 102-4 connected to the parallel input terminals, a programmable encoder 231 connected to the parallel buffer circuits, delay control buffer circuits 105-1 to 105-4 for performing delay control over the low-speed parallel digital data signals each outputted from the encoder 231, multiplexing circuits (MUX) 106-1 to 106-4 connected to the delay control buffer circuits, output terminals 107-1 to 107-4 for electric high-speed serial digital signal streams outputted from the respective multiplexing circuits, a processor (CPU) 174, and a non-volatile memory 176.

Since the present embodiment performs, with respect to low-speed parallel data as a target, an encoding process using the encoder 231 and individual delay adjustment for each of the signal lines by using the delay control buffer circuits 105, it allows easy integration of an electric circuit unit. By mounting the programmable encoder 231, a versatile IC for multilevel optical modulation can be provided. By integrating the processor (CPU) 174 for delay control, the non-volatile memory 176, an internal bus 175-1, an external connection bus 175-2, and also a control line 125 on the integrated circuit substrate, the present embodiment allows the storing of delay control data in the IC, writing of amounts of delay control from the outside through IC terminals connected to the external connection bus 175-2, and automatic setting of the amounts of delay control to the delay control buffer circuits 105 by the processor 176 upon the activation of the transmitter.

Although the number of the parallel input terminals 101 to which the low-speed parallel signals are supplied is the same as the number of the terminals 107 to which the high-speed signals are outputted, the numbers of input/output signals may be different in the same manner as in the Trellis coder and the multilevel ASK signal precoder described above.

The circuit function shown in FIG. 21 may also be divided into a plurality of ICs as necessary. When the multiplexing circuits 106 are provided as external circuits, the IC unit including only the low-speed circuits can easily be implemented by an FPGA or a versatile ASIC. By providing the parallel buffer 102 and the encoder 302 in different ICs, a versatile IC for use in delay adjustment independent from an encoding format can be provided. As described in the fourth embodiment, it is also possible to impart to the IC the function of accurately adjusting delay by adjusting the phase of the clock to be supplied to each of the multiplexing circuits 106. In this case, a structure may also be adopted such that phase control is performed from the outside via a dedicated control terminal instead of storing parameters for clock phase control in the non-volatile memory 176.

Embodiment 10

Figure 22:
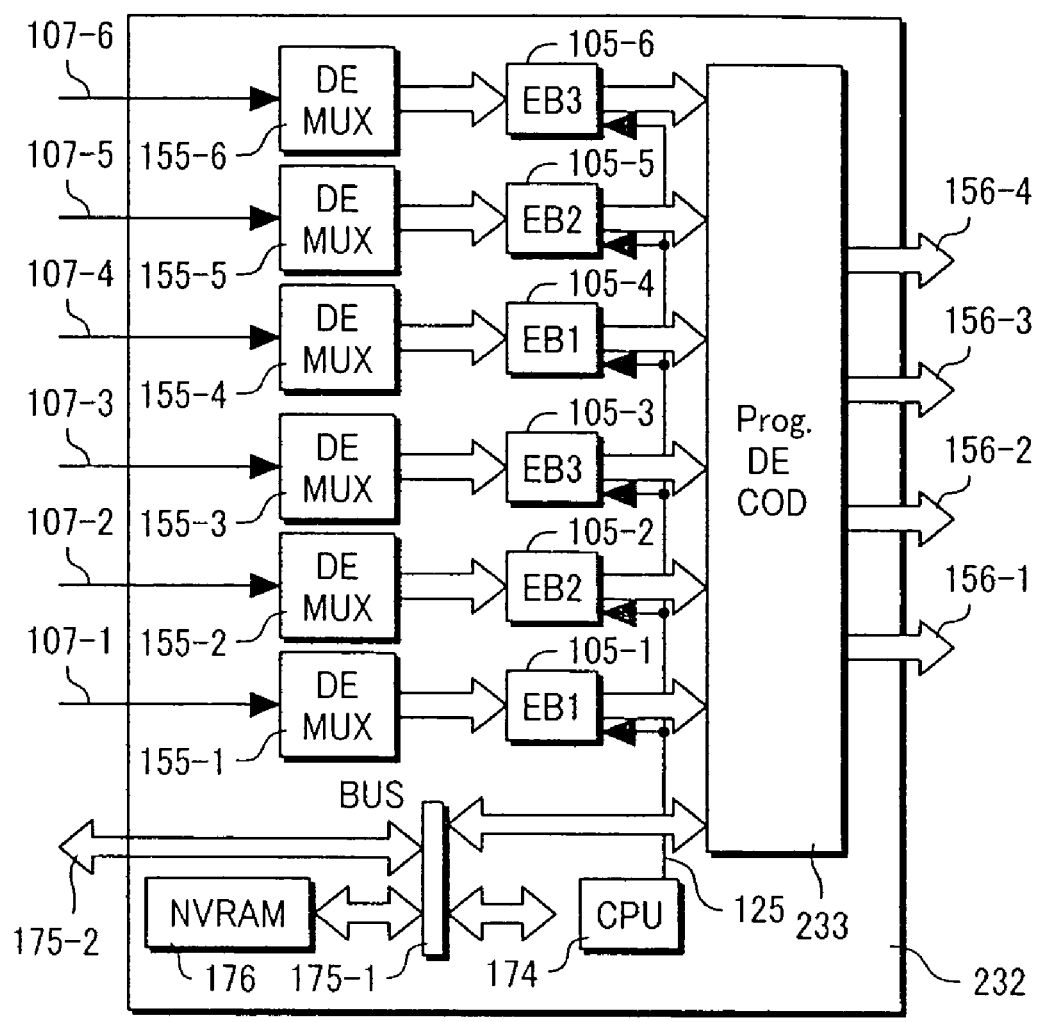
FIG. 22 is a view showing another embodiment of a semiconductor integrated circuit prepared for an optical receiver according to the present invention.

FIG. 22 shows an example of a semiconductor integrated circuit (IC) 232 prepared for an optical receiver to which the delay control buffer circuits 105 have been applied.

The IC according to the present embodiment is obtained by integrating the electric circuit unit including the demultiplexers 155-1 to 155-6 and post stage circuits thereof in the optical receiver shown in FIG. 19. The IC according to the present embodiment comprises input terminals and signal paths 107-1 to 107-6 for electric high-speed serial digital signals as inputs, demultiplexers (DEMUX) 155-1 to 155-6, delay control buffer circuits 105-1 to 105-6, a programmable decoder 233, output terminals 156-1 to 156-4 for electric low-speed parallel digital data, a processor (CPU) 174 for delay control, an non-volatile memory 176, internal and external buses 175-1 and 175-2, and a control line 125.

In the same manner as in the ninth embodiment, the IC according to the present embodiment is also allowed to divide or add a function as necessary. For example, a structure may also be adopted such that the demultiplexers 155 are provided as external circuits, the decoder 233 is provided in another IC, or the clock extraction and data recovery circuit 154 of FIG. 19 is added.

The delay control buffer circuits adopted in the embodiments described above can adjust delay on the order of the one to several thousands of bit lengths of the high-speed serial digital signal by changing the capacity of a buffer memory used therein and the set amounts of delay control. For example, delay control equivalent to 2000 bits corresponds to a wiring length change of about 40 m when the transmission rate of the digital signals is 10 Gbit/s. In the design of an optical transmitter having a plurality of signal paths connected to an optical modulator and an optical receiver having a plurality of signal paths connected to an optical demodulator, the present invention allows an increase in the margin of adjusting the lengths of the paths including the internal optical fiber such that they are equal and significantly facilitates wiring design for the transmitter and the receiver.

Since the delay control buffer circuits adopted in the present invention allow signal delay values to be changed freely by changing control values, they are effective in scaling down the optical transmission equipment by omitting the trouble of adjusting the lengths of delay lines which arises when analog delay lines are adopted.

What is claimed is:

1. Optical transmission equipment comprising:
   an optical modulation unit including a plurality of optical modulators coupled to an internal optical transmission path; and
   an electric circuit unit for generating a plurality of high-speed serial digital signal streams to be supplied to said optical modulation unit,
   wherein said electric circuit unit includes:
   a plurality of parallel signal paths each for transferring an N-bit-parallel low-speed digital signal stream (N is an integer more than 1);
   a plurality of multiplexing circuits each for converting the N-bit-parallel low-speed digital signal stream received from one of said parallel signal paths into a high-speed serial digital signal stream to be supplied to said optical modulation unit; and
   a delay control buffer circuit inserted in at least one of said parallel signal paths to receive the N-bit-parallel low-speed digital signal stream,
   wherein said delay control buffer circuit performs delay adjustment on the N-bit-parallel low-speed received digital signal stream, with a timing unit of a bit period of the high-speed serial digital signal stream or with the timing unit corresponding to an integral fraction of the bit period and outputs the resultant digital signal stream to the parallel signal path.

2. The optical transmission equipment according to claim 1, wherein said delay control buffer circuit temporarily stores the N-bit-parallel low-speed received digital signal stream as logically serially arranged data and outputs stored data beginning at a bit position selected in accordance with a preliminarily specified amount of delay adjustment as a delay adjusted N-bit-parallel low-speed digital signal stream to said signal path.

3. The optical transmission equipment according to claim 2, wherein said delay control buffer circuit comprises:
   a memory for temporarily storing the N-bit-parallel received digital signal stream as said logically serially arranged data;
   a write address generator for generating a write address for N-bit parallel data;
   a register for storing said preliminarily specified amount of delay adjustment; and
   a read address generator for generating a read address for N-bit data to be outputted to said signal path based on the write address outputted from said write address generator and on the amount of delay adjustment stored in said register.

4. The optical transmission equipment according to claim 1, wherein said electric circuit unit includes:
   a clock generator for generating clock signals to be supplied to said multiplexing circuits; and
   an accurate delay adjustment unit for adjusting a phase of one of said clock signals to be supplied to a specified one of the multiplexing circuits in accordance with a preliminarily specified amount of delay adjustment,
   wherein each of said multiplexing circuits outputs each bit of the high-speed serial digital signal stream with a specified timing determined in accordance with the supplied clock signal.

5. The optical transmission equipment according to claim 1, wherein
   at least two of said parallel signal paths include said delay control buffer circuit, and
   said electric circuit unit includes:
   a memory for storing the amount of delay adjustment in association with each of said parallel signal paths; and
   a control unit for setting the amount of delay adjustment stored in said memory to said delay control buffer circuits.

6. The optical transmission equipment according to claim 4, wherein
   at least two of said parallel signal paths include said delay control buffer circuit, and
   said electric circuit unit further includes:
   a memory for storing the amount of delay adjustment and the amount of clock phase control in association with each of said parallel signal paths; and
   a control unit for setting the amount of delay adjustment stored in said memory to said delay control buffer circuits and the amount of clock phase control stored in said memory to said accurate delay adjustment unit.

7. Optical transmission equipment comprising:
   an optical modulation unit including a plurality of optical modulators coupled to an internal optical transmission path; and
   an electric circuit unit for generating a plurality of high-speed serial digital signal streams to be supplied to said optical modulation unit,
   wherein said electric circuit unit includes:
   a plurality of parallel signal paths each for transferring an N-bit-parallel low-speed digital signal stream (N is an integer more than 1) encoded by an encoder;
   a plurality of multiplexing circuits each connected to one of said parallel signal paths to convert the N-bit-parallel low-speed digital signal stream into a high-speed serial digital signal stream to be supplied to said optical modulation unit; and
   at least one delay adjustment unit for adjusting delay of the N-bit-parallel low-speed digital signal stream in at least one of said parallel signal paths, with a timing unit of a bit period of the high-speed serial digital signal stream and accurately adjusting the delay within the bit period by controlling the output timing of each bit in the high-speed serial digital signal stream to be outputted from said multiplexing circuit connected to the signal path.

8. The optical transmission equipment according to claim 1, wherein said electric circuit unit includes a signal synthesizing circuit for combining two of the high-speed serial digital signal streams outputted from said plurality of multiplexing circuits and outputting the resultant combination as a high-speed serial digital signal stream for optical modulation.

9. The optical transmission equipment according to claim 1, wherein
said electric circuit unit includes:
a driver circuit for receiving one of the two high-speed serial digital signal streams outputted from a pair of two of said plurality of multiplexing circuits; and
a driver circuit with inverted output for receiving the other of the two high-speed serial digital signal streams, and
wherein respective output signals from said driver circuit and said driver circuit with inverted output are supplied in parallel to one of the optical modulators included in said optical modulation unit.

10. The optical transmission equipment according to claim 1, wherein
said electric circuit unit includes an encoder for encoding at least two of low-speed digital signal streams supplied in parallel to convert into a plurality of N-bit-parallel low-speed digital signal streams, and
the N-bit-parallel low-speed digital signal streams resulting from the encoding are outputted to said parallel signal paths.

11. The optical transmission equipment according to claim 1, wherein
said electric circuit unit includes a plurality of encoders each for encoding at least two streams of low-speed digital signals supplied in parallel into a plurality of N-bit-parallel low-speed digital signal streams, and
the N-bit-parallel low-speed digital signal streams resulting from the encoding are outputted to said parallel signal paths.

12. The optical transmission equipment according to claim 9, wherein
said electric circuit unit includes:
an encoder for encoding low-speed digital signals supplied in parallel and outputting a pair of parallel low-speed digital signal streams; and
first and second splitters for dividing said pair of parallel low-speed digital signal streams outputted from the encoder into a first and second pairs of N-bit-parallel low-speed digital signal streams, and
wherein two of said multiplexing circuits connected to a first pair of parallel signal paths to which the first pair of the N-bit-parallel low-speed digital signal streams are outputted from said first splitter and two of the multiplexing circuits connected to a second pair of parallel signal paths to which the second pair of the N-bit-parallel low-speed digital signals are outputted from said second splitter respectively form said pair of two of the multiplexing circuits.

13. Optical transmission equipment comprising:
an optical demodulation unit for converting a multilevel modulated optical signal received from an external optical transmission path into a plurality of electric high-speed serial digital signal streams and outputting the plurality of high-speed serial digital signal streams; and
an electric circuit unit for converting the plurality of high-speed serial digital signal streams received from said optical demodulation unit into a plurality of low-speed digital signal streams and outputting the plurality of low-speed digital signal streams,
wherein said electric circuit unit comprises:
a plurality of parallel signal paths each for transferring an N-bit-parallel digital signal stream (N is an integer more than 1);
a plurality of demultiplexers each for converting one of said high-speed serial digital signal streams into an N-bit-parallel low-speed digital signal stream and outputting the N-bit-parallel low-speed digital signal stream to one of said parallel signal paths;
a delay control buffer circuit for performing delay adjustment on the N-bit-parallel low-speed digital signal stream, in at least one of said parallel signal paths, with the timing unit of a bit period of the high-speed serial digital signal stream or with a timing unit corresponding to an integral fraction of the bit period and outputting the resultant low-speed digital signal stream; and
at least one decoder for converting the plurality of N-bit-parallel low-speed digital signal streams received from said parallel signal paths into low-speed parallel digital signals in a different code.

14. The optical transmission equipment according to claim 13, wherein said delay control buffer circuit temporarily stores the N-bit-parallel low-speed digital signal stream as logically serially arranged data and outputs stored data beginning at a bit position selected in accordance with a preliminarily specified amount of delay adjustment as delay adjusted N-bit-parallel low-speed digital signal stream to said signal path.

15. The optical transmission equipment according to claim 14, wherein said delay control buffer circuit comprises:
a memory for temporarily storing the N-bit-parallel low-speed digital signal stream as said logically serially arranged data;
a write address generator for generating a write address for the N-bit parallel data;
a register for storing said preliminarily specified amount of delay adjustment; and
a read address generator for generating a read address for the N-bit data to be outputted to said signal path based on the write address outputted from said write address generator and on the amount of delay adjustment stored in said register.

16. The optical transmission equipment according to claim 13,
wherein said electric circuit unit includes, as said decoder, at least one of a decoder for phase modulator, a decoder for multilevel modulation, and a Trellis decoder.

17. An integrated circuit for optical transmission equipment, the integrated circuit comprising:
an encoder for receiving a plurality of N-bit-parallel low-speed digital signal streams (N is an integer more than 1);
a plurality of parallel signal paths each for transferring one of said N-bit-parallel low-speed digital signal streams outputted from said encoder;
a plurality of multiplexing circuits each for converting the N-bit-parallel low-speed digital signal stream received from one of said parallel signal paths into a high-speed serial digital signal stream to be supplied to an optical modulation unit;
a plurality of delay control buffer circuits each inserted in one of said parallel signal paths to perform delay adjustment on the N-bit-parallel low-speed digital signal stream, with a timing unit of a bit period of the high-speed serial digital signal stream or with the timing unit corresponding to an integral fraction of the bit period and output the resultant delay adjusted digital signal stream; and means for selectively setting an amount of delay adjustment to each of said delay control buffer circuits.

18. An integrated circuit for optical transmission equipment, the integrated circuit comprising:

a plurality of demultiplexers each for receiving a high-speed serial digital signal stream, converting the received high-speed serial digital signal stream into an N-bit-parallel low-speed digital signal stream (N is an integer more than 1), and outputting the N-bit-parallel low-speed digital signal stream;

a plurality of parallel signal paths each for transferring the N-bit-parallel low-speed digital signal stream outputted from said demultiplexers;

a plurality of delay control buffer circuits each inserted in one of said parallel signal paths to perform delay adjustment on the N-bit-parallel low-speed digital signal stream, with a timing unit of a bit period of the high-speed serial digital signal stream or with the timing unit corresponding to an integral fraction of the bit period and output the resultant digital signal stream;

a decoder connected to said plurality of parallel signal paths; and means for selectively setting an amount of delay adjustment to each of the delay control buffer circuits.

* * * * *